United States Patent
Stanciu et al.

(10) Patent No.: US 10,541,852 B2
(45) Date of Patent: Jan. 21, 2020

(54) PREAMBLE DETECTION MECHANISM FOR RECEPTION OF ASYNCHRONOUS PACKETS

(71) Applicant: NXP USA, Inc., Austin, TX (US)

(72) Inventors: Mihai-Ionut Stanciu, Bucharest (RO); Khurram Waheed, Austin, TX (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 15/895,458

(22) Filed: Feb. 13, 2018

(65) Prior Publication Data

US 2019/0158335 A1    May 23, 2019

(30) Foreign Application Priority Data

Nov. 23, 2017   (RO) ..................... A/00974

(51) Int. Cl.
*H04L 27/26*   (2006.01)
*H04L 27/14*   (2006.01)
*H04L 27/38*   (2006.01)

(52) U.S. Cl.
CPC ......... *H04L 27/2675* (2013.01); *H04L 27/14* (2013.01); *H04L 27/2657* (2013.01); *H04L 27/3863* (2013.01)

(58) Field of Classification Search
CPC . H04L 27/2675; H04L 27/2657; H04L 27/14; H04L 27/3863
USPC ........................................ 375/340, 332, 344
See application file for complete search history.

(56) References Cited

U.S. PATENT DOCUMENTS

| 7,844,004 | B2 | 11/2010 | De Rore |
| 8,270,528 | B2 | 9/2012 | Zeng et al. |
| 8,406,325 | B2 | 3/2013 | Tsao et al. |
| 8,644,426 | B1 * | 2/2014 | Zhou .................. H04B 1/1027 375/332 |
| 8,712,330 | B2 | 4/2014 | Desai et al. |
| 8,855,249 | B2 | 10/2014 | Nemeth |
| 9,184,971 | B2 | 11/2015 | Lerner et al. |
| 2004/0120412 | A1 | 6/2004 | Banerjea |

(Continued)

FOREIGN PATENT DOCUMENTS

| EP | 1793551 B1 | 6/2009 |
| WO | 2016/057431 | 4/2016 |

OTHER PUBLICATIONS

Bluetooth Low Energy Whitepaper, LitePoint Corporation, Oct. 2016, Rev. 2, pp. 1-19.

(Continued)

*Primary Examiner* — Chieh M Fan
*Assistant Examiner* — Fitwi Y Hailegiorgis

(57) ABSTRACT

Processing of a data packet within a received wireless signal includes determining a frequency modulation ("FM") domain carrier frequency offset ("CFO") estimate component from a plurality of samples of the received wireless signal, determining a phase domain CFO estimate component from the plurality of samples of the received wireless signal, and determining a CFO estimation as a function of the FM domain CFO estimate component and the phase domain CFO estimate component. The data packet may be a Bluetooth Low Energy data packet. The FM domain CFO estimate component and the phase domain CFO estimate component may be determined from samples of a preamble field of the data packet.

17 Claims, 10 Drawing Sheets

(56) References Cited

U.S. PATENT DOCUMENTS

| | | | |
|---|---|---|---|
| 2006/0115021 A1 | 6/2006 | Puma et al. | |
| 2006/0222095 A1 | 10/2006 | Niu et al. | |
| 2007/0160158 A1 | 7/2007 | Zeng et al. | |
| 2008/0095249 A1 | 4/2008 | Yoon et al. | |
| 2011/0019782 A1* | 1/2011 | Kobayashi | H04L 27/2659 375/344 |
| 2016/0381581 A1 | 12/2016 | Stanciu et al. | |
| 2017/0257247 A1* | 9/2017 | Zhao | H04L 27/2663 |

OTHER PUBLICATIONS

Boldrini, S, "Recognition of Bluetooth Signals Based on Feature Detection," Sapienza Universita Di Roma, Anno Accademico 2009/2010, 89 pages.

Cho, K. et al., "Analysis of Latency Performance of Bluetooth Low Energy (BLE) Networks," Sensors, vol. 15, pp. 59-78, Dec. 23, 2014.

Ibrahim, H., "Bluetooth Receiver Design Based on Laurent's Decomposition," B. Eng., American University of Beirut, Dec. 2005, 112 pages.

Lindh, J., "Bluetooth Low Energy Beacons," Application Report, Texas Instruments, SWRA475A, Jan. 2015, Revised Oct. 2016, 16 pages.

Litovsky, G., "A look into Bluetooth v4.2 for Low Energy Products," EDN Network, May 4, 2015, 6 pages.

Minn, H., et al., "Estimation of Carrier-Frequency Offset and Frequency-Selective Channels In Mimo OFDM Systems Using a Common Training Signal," Proc. WNCG Wireless Networking Symposium, Austin, Texas, Oct. 2004, 5 pages.

Nguyen, C., "Robust time and frequency synchronization in 802.11a communication wireless system," Signal and Image Processing, Université Paris-Nord—Paris XIII, 2014, 154 pages.

Tadjikov, M., "Examination of Techniques for Carrier Frequency Estimation of Frequency Hopped Signals in Time Domain," 2010, 41 pages.

Tibenderana, C., "A High-Performance, Efficient, and Reliable Receiver for Bluetooth Signals," Doctoral Thesis, University of Southampton, Faculty of Engineering and Applied Science, Department of Electronics and Computer Science, Dec. 2005, 156 pages.

Tibenderana, C., et al., "Low-Complexity High-Performance GFSK Receiver With Carrier Frequency Offset Correction," Communications Research Group, School of Electronics & Computer Science, University of Southampton, UK, IEEE International Conference on Acoustics, Speech and Signal Processing, Jan. 2004, pp. IV-933-IV-936.

Weiss, T., et al., "Synchronization Algorithms and Preamble Concepts for Spectrum Pooling Systems," in Proc. IST Mobile and Wireless Communications Summit, Aveiro, Portugal, Jun. 2003, pp. 788-792.

Wikipedia, Bluetooth, Retrieved from https://en.wikipedia.org/w/index.php?title=Bluetooth&oldid=785373046, 22 pages, last edited on Jun. 13, 2017.

* cited by examiner

PREAMBLE DETECTION MECHANISM FOR RECEPTION OF ASYNCHRONOUS PACKETS

FIELD

The present invention is generally related to wireless communications, and more specifically, to carrier frequency offset estimation for wireless communications.

BACKGROUND

The Internet of Things ("IoT") is the network of physical devices, vehicles, buildings, and other items embedded with electronics, software, sensors, actuators, and network connectivity that enable these objects to collect and exchange data. The deployment of IoT relies on networks of low-cost wireless devices that reliably work in the presence of interference. However, such low-cost wireless devices are sensitive to carrier frequency offset ("CFO") between the transmitter and receiver, especially under circumstances where there is a low signal-to-noise ratio ("SNR"). CFO often occurs when the local oscillator signal for downconversion in the receiver does not synchronise with the carrier signal contained in the received signal. This phenomenon can be attributed to two factors: frequency mismatch in the transmitter and the receiver oscillators, and the Doppler effect as the transmitter or the receiver is moving. When this occurs, the received signal will be shifted in frequency.

For an OFDM system, the orthogonality among subcarriers is maintained only if the receiver uses a local oscillation signal that is synchronous with the carrier signal contained in the received signal. Otherwise, a mismatch in carrier frequency can result in inter-carrier interference ("ICI"). The oscillators in the transmitter and the receiver will most likely never be oscillating at an identical frequency. Therefore, a carrier frequency offset almost always exists even if there is no Doppler effect.

As a result, especially under the circumstances of such wireless communications where there is a low SNR, it is important that the receiver produce an adequate CFO estimation to compensate for the CFO. Poor CFO estimation results in poor demodulator performance in the presence of crystal frequency mismatches between various nodes in such a wireless communication network. Various frequency offset estimation techniques have been developed to correct for CFO in the receiver. However, the various techniques can be complex and expensive in terms of hardware, memory usage, and/or the power requirements of the device in which the receiver is implemented.

A particular type of wireless communication network where it is important to perform CFO estimation in devices that need to be implemented at a low cost and at low-power requirements is Bluetooth® Low Energy ("BLE"), including BLE Long-Range ("BLE-LR"). More details about BLE can be found within the Bluetooth® v5.0 Specification, which is hereby incorporated by reference herein.

DETAILED DESCRIPTION

In asynchronous radio frequency ("RF") communications, one of the most important challenges is represented by the tight Link Layer timings, whereby the latency of the receive path must be small enough to be able to meet them from a receiver to transmitter ("RX to TX") turnaround perspective. In particular, a BLE Long-Range ("BLE-LR") radio should have a receiver latency not greater than 150 μs and, within the same time period, be able to demodulate the access address ("AA") for error detection purposes. Given that a significant part of the latency budget is already consumed by the Link Layer logic and by the transmitter warmup during the RX to TX turnaround, the mission of the Physical Layer ("PHY") is made even more difficult, especially if synchronous demodulation is implemented, since synchronous demodulation allows for a low current drain, which is desirable for low-power IoT devices. Additionally, the SNR operating point is negative, and a wide span of carrier frequency offset ("CFO") values must be supported. The largest CFO that may need to be supported is about 1.2 times larger than the frequency deviation of the FM modulation.

Embodiments of the present invention provide a system and method for detection of a preamble in received data packets, in which a CFO estimation is produced and then utilized to compensate the incoming signals carrying the data packets. To compensate for CFO wrapping, embodiments of the present invention are configured to utilize two CFO estimator components for determining a CFO estimation to apply to the incoming signals: (1) a more "coarse" CFO estimator component that is insensitive to π-wraps, but has a high error standard deviation (used for CFO coarse localization); and (2) a more "fine" CFO estimator component that is sensitive to π-wraps, but is more accurate (used for CFO fine estimation).

The description that follows includes exemplary systems, methods, techniques, instruction sequences, and computer program products that embody techniques pertaining to embodiments of the present invention. However, it is understood that the described embodiments may be practiced without these specific details. For instance, although examples refer to techniques for detecting Bluetooth® communication devices, embodiments are not so limited. In other embodiments, various other devices and standards (e.g., wireless local area network ("WLAN") devices, such as IEEE 802.11 compatible devices) can execute the device detection techniques described herein. In other instances, well-known instruction instances, protocols, structures, and techniques have not been shown in detail in order not to obfuscate the description.

Figure 1:
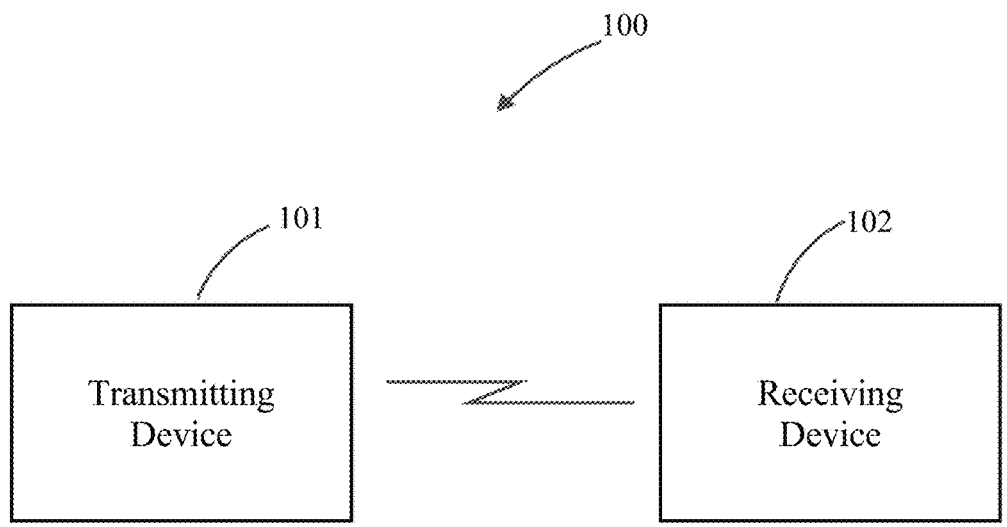
FIG. 1 illustrates a block diagram of a wireless network configured in accordance with embodiments of the present invention.

FIG. 1 illustrates a block diagram of a communication system 100 configured in accordance with embodiments of the present invention. Though embodiments of the present invention are presented herein with respect to such a communication system implemented as a wireless communication system, aspects of the present invention are not limited to such configurations. The communication system 100 includes a device 101 that includes a transmitter (not shown) configured to send out a communication (e.g., wireless), which is received by a device 102 that includes a receiver (e.g., wireless) as further described herein with respect to FIG. 2. The communication system 100 may be implemented within a IoT network that complies with one of several standards relevant to IoT (e.g., an IEEE 802.15.4 standard), or a Bluetooth® Low Energy ("BLE") standard (e.g., BLE Long-Range ("BLE-LR"). Each of the devices 101 and 102 may be any electronic device appropriate for communication within such wireless systems, including, but not limited to, a smartphone, watch, proximity tag, remote control, personal device for entertainment or fitness, sensor, environmental control device (e.g., a thermostat), remote camera, desktop computer, laptop computer, tablet, notepad, etc.

Figure 2:
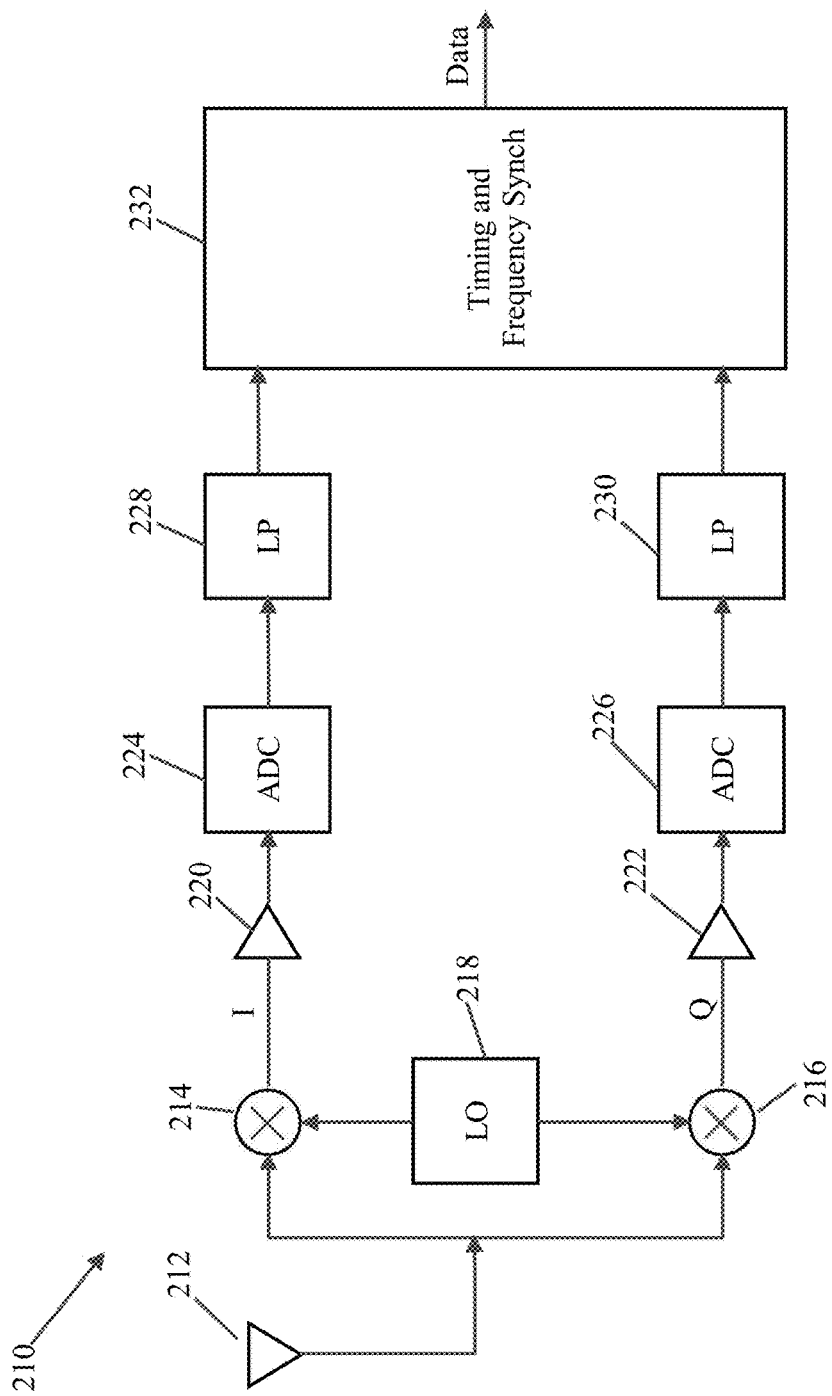
FIG. 2 illustrates a block diagram of a wireless receiver configured in accordance with embodiments of the present invention.

FIG. 2 illustrates a block diagram of a receiver 210 implemented with the device 102. The receiver 210 may be implemented within a communication unit in the device 102 configured with Bluetooth® communication capabilities. Such a communication unit can implement protocols and functionality to enable Bluetooth® communication in the wireless communication system 100. In accordance with some embodiments of the present invention, in addition to Bluetooth® communication protocols, the communication unit may be configured with other protocols and functionality to enable other types of communications (e.g., WLAN, Ethernet, WiMAX, powerline communications, etc.). In accordance with some embodiments of the present invention, the communication unit may be implemented within a system-on-a-chip ("SoC") or other type of integrated circuit ("IC"). Although not depicted within FIGS. 1 and 2, such a communication unit can include a transmitter unit and a receiver unit (e.g., the receiver 210).

The receiver 210 is coupled to an antenna 212 and may include circuitry configured as mixers 214 and 216, a local oscillator ("LO") 218, amplifiers 220 and 222, analog-to-digital converters ("ADCs") 224 and 226, low pass filters 228 and 230, and a timing and frequency synchronization block 232.

In accordance with embodiments of the present invention, the receiver 210 is configured to identify a pair of communicating devices (e.g., the devices 101 and 102) for establishing a communication link (e.g., a BLE communication link) over the wireless communication system 100. A wireless signal, such as a radio frequency ("RF") signal, is received at the antenna 212. In accordance with embodiments of the present invention, such a wireless signal may include one or more BLE data packets received from the transmitting device 101. Such a RF signal may include an incurred CFO between the devices 101 and 102, which the receiver 210 is configured to correct as described herein with respect to embodiments of the present invention.

In accordance with some embodiments of the present invention, the RF signal may be received via a network interface of a BLE communication unit implemented within the device 102. For example, the RF signal may be received at the network interface that couples the BLE communication unit and the antenna 212. The RF signal may be split and provided to the mixers 214 and 216 where the received signal is mixed with a local oscillator signal to produce in-phase ("I") and quadrature ("Q") signal components. The I and Q signal components may then follow two paths to the timing and frequency synchronization block 232. The I and Q signal components may be amplified by the amplifiers 220 and 222 and converted to digital signals using the ADCs 224 and 226. The digital low pass filters 228 and 230 may then down convert the I and Q signal components to baseband. The timing and frequency synchronization block 232 is configured to provide symbol/chip synchronization and frequency/phase adjustment. The timing and frequency synchronization block 232 is further discussed with respect to FIG. 5.

Figure 3:
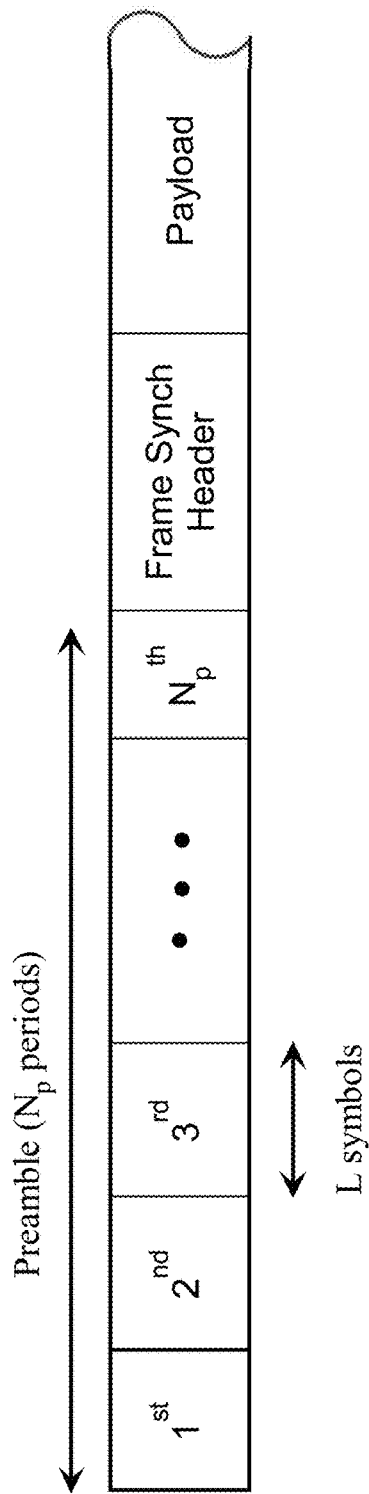
FIG. 3 illustrates an exemplary data packet structure communicated between the transmitter and the receiver of FIG. 1.

FIG. 3 illustrates a generic packet structure, which may be received and processed in accordance with embodiments of the present invention. The preamble field includes a predetermined repetitive pattern that contains $N_P$ periods. Each period has L symbols (from a protocol perspective) and M samples (from a processing perspective). Thus, the ratio M/L is the receiver's over-sampling rate. In general, the preamble field is followed by a frame synchronization header, which is followed by a payload field.

Figure 4:
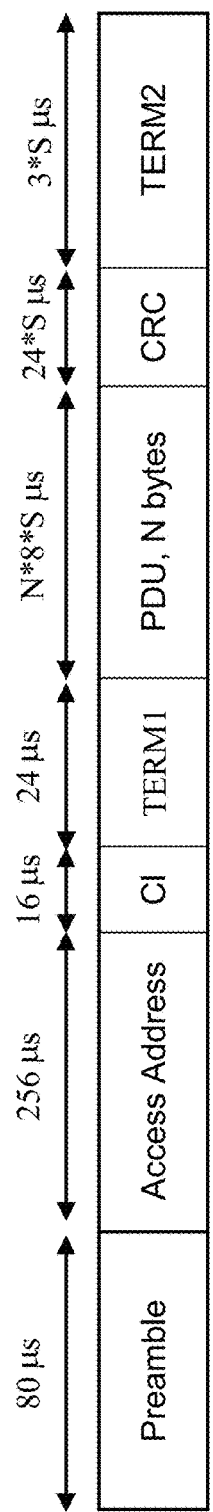
FIG. 4 illustrates a BLE-LR packet structure, which may be communicated between the transmitter and receiver of FIG. 1.

FIG. 4 illustrates a structure of a BLE-LR packet for which $N_P=10$ and L=8, from the perspective of mapping it on the generic packet structure of FIG. 3. The BLE-LR packet includes a preamble field (also referred to herein as simply the "preamble"), an access address ("AA") field, and a payload field, which may include a rate indication ("CI") field, a first TERM1 field, a payload data unit ("PDU"), a cyclic redundancy check ("CRC") field, and a second TERM2 field. However, the fields following the preamble are not of interest for certain embodiments of the present invention described herein. For purposes of describing non-limiting, exemplary embodiments of the present invention, the over-sampling ratio of the receiver 210 is 8 (and thus, M=64), and K preamble periods are utilized for one correlation, as will be further discussed herein.

Before decoding the payload field, the Bluetooth® device receiving an incoming packet (e.g., the receiving Bluetooth® device 102) may need to identify the Bluetooth® device that is transmitting the packet (e.g., the transmitting Bluetooth® device 101) and to determine whether the incoming packet is intended for the receiving Bluetooth® device. As will be further described herein, embodiments of the present invention are configured for detecting and processing such an incoming data packet.

Figure 5:
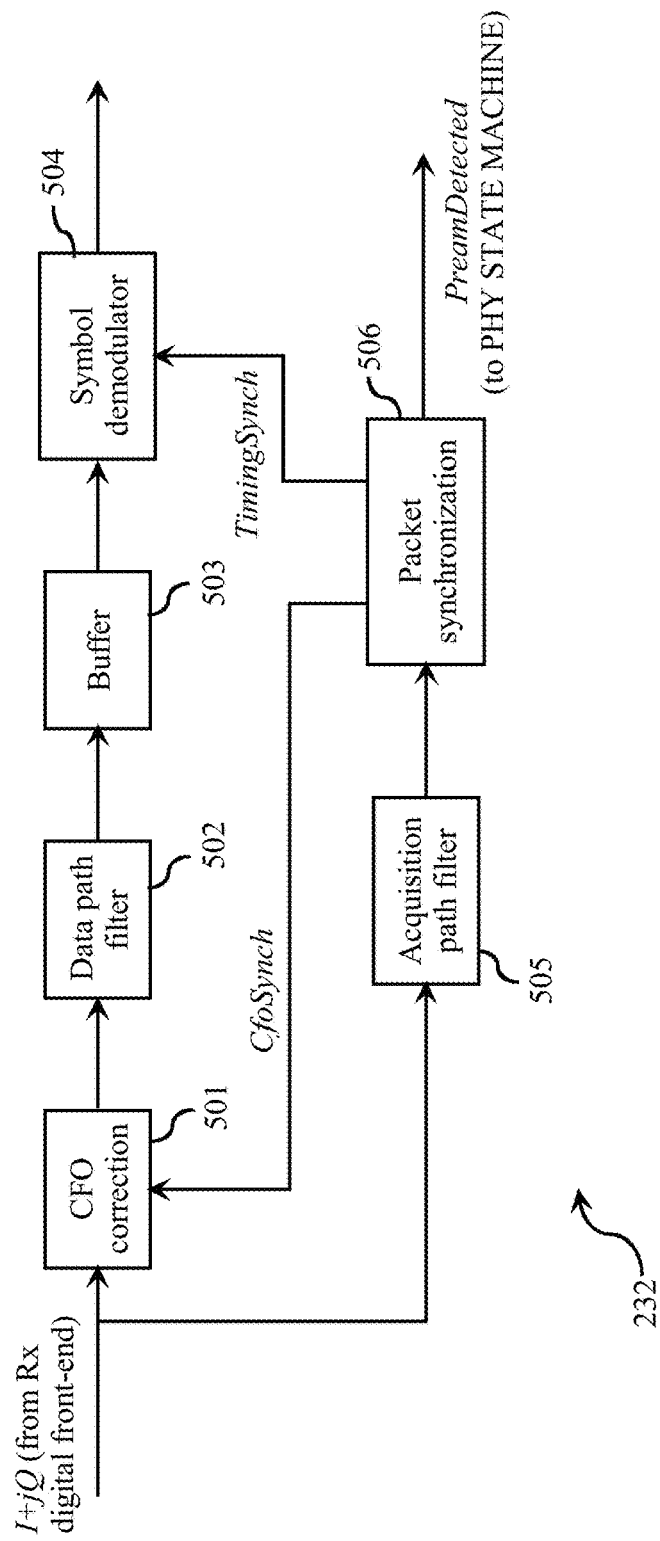
FIG. 5 illustrates a block diagram of a PHY state machine configured in accordance with embodiments of the present invention.

FIG. 5 illustrates a block diagram of further details pertaining to the timing and frequency synchronization block 232 of FIG. 2, which provides a description of a state machine for the PHY. The I and Q signal components (denoted as I+jQ in FIG. 5) are received by the timing and frequency synchronization block 232. In accordance with embodiments of the present invention, these signals may not be initially processed by the CFO correction process block 501. As further described hereinafter, these signal components may instead first be processed by the packet synchronization block 506 after processing by the acquisition path filter 505. Such filtered I and Q signal components are delivered to the packet synchronization block 506, which is further described with respect to FIG. 6.

The packet synchronization block 506 is configured to provide a CFO estimation (denoted as CFOSynch herein) to the CFO correction process block 501, a timing signal (denoted as TimingSynch herein) to the symbol demodulator 504, and a preamble detection signal (denoted as PreamDetected herein) to a state machine of the PHY.

As previously noted, the PHY state machine may be configured to disable operation of the data path that includes the CFO correction process block 501, the data path filter 502, the buffer 503, and the symbol demodulator 504 until there has been a detection of a data packet preamble by the packet synchronization block 506. When a preamble has been detected, then this data path is enabled to process the incoming I and Q signal components from the digital front-end of the receiver 210 (see FIG. 2).

Such a PHY state machine is not shown for the sake of simplicity, but may be implemented with any well-known state machine circuitry and/or algorithms. Essentially, before a preamble is detected, the system may be configured so that the PreamDetected signal is set to a low value (e.g., 0). In response, such a PHY state machine may be configured to disable functioning of the CFO correction process block 501, the data path filter 502, the buffer 503, and the symbol demodulator 504. When a preamble is detected, the synchronization logic block 617 described hereinafter with respect to FIGS. 6 and 7 may be configured to change this PreamDetected value to a high value (e.g., 1). In response to the changing of this PreamDetected value to a high value, the PHY state machine may be configured to enable the processing of the CFO correction process block 501, the data path filter 502, the buffer 503, and the symbol demodulator 504, so that they can process the incoming I and Q signal components with the also available CFO estimation and timing signal (i.e., CFOSynch and TimingSynch). The CFO correction process block 501 will then utilize the CFO estimation, CFOSynch, received from the packet synchronization block 506 to perform a CFO correction on the incoming I and Q signal components.

In accordance with embodiments of the present invention, I/Q and phase relations that may be utilized in the CFO correction process block 501 to process incoming signals are:

$$x_t^{out} = x_t^{in} * \exp(-2*\pi*CFOSynch*t)$$

$$\varphi_t^{out} = \varphi_t^{in} - 2*\pi*CFOSynch*t$$

where t represents time.

Thus, if the timing and frequency synchronization block 232 is configured to process incoming signals in the I/Q domain, then the CFO correction process block 501 may be configured to utilize the first above relation for $x_t^{out}$ to perform CFO corrections. However, if the timing and frequency synchronization block 232 is configured to process incoming signals in the phase domain, then the CFO correction process block 501 may utilize the second above relation for $\varphi_t^{out}$ to perform CFO corrections.

If a past portion of the incoming signal needs to be used for demodulation, a buffer 503 may be utilized, which can affect the latency. The buffer 503 may be configured to hold samples because, after the timing synchronization has been extracted from the Access Address, there may be some ambiguity as to where it begins and where the PDU begins. The buffer 503 may also be configured to account for a latency in the processing of signals by the acquisition path filter 505. Thus, a role of the buffer 503 may be to absorb latency of the CFO estimation. That is, in accordance with embodiments of the present invention, it is likely that the CFO estimation will be made available to the CFO correction process block 501 after the beginning of the signal portion that has to be corrected, so the buffer 503 may be utilized to be able to "look back."

The acquisition path filter 505 is configured to operate as a bandpass filter of a predetermined width for removing noise at frequencies not required by embodiments of the present invention. In accordance with embodiments of the present invention, the width of the acquisition path filter 505 may be configured to be wider than that of the data path filter 502 to provide CFO range, i.e., when a CFO is present, it may be desired that signal energy not be lost due to a frequency offset of the signal spectrum. However, after the CFO is corrected, and the signal frequency spectrum is centered by the CFO correction process block 501, a narrower filter may be utilized within the data path filter 502 than was implemented within the acquisition path filter 505 to reject as much noise as possible. In accordance with a non-limiting, exemplary embodiment of the present invention utilizing a BLE-LR communications network, the acquisition path filter 505 may be configured with a cut-off frequency of 580 kHz, while the data path filter 502 may be configured with a cut-off frequency of 500 kHz.

The symbol demodulator 504 may be configured to operate like a typical symbol demodulator known in the art to derive the data packet from the received wireless (e.g., RF) signal (e.g., determine the data signals that were received in the BLE data packet), which are then delivered to the Link Layer for utilization by the device 102 implementing the receiver 210. The output of the symbol demodulator 504 may be provided for subsequent processing by other processing components of the receiver 210 (e.g., post processing filter units, post processing amplifiers, etc.).

Embodiments of the present invention may be implemented with any appropriate modulation scheme, including, but not limited to, filtered FSK modulation schemes (e.g., GFSK/GMSK modulation). Furthermore, aspects of the present invention may be implemented for all modulation schemes where the synchronization word used for CFO estimation has been spread in the time domain using coding, spreading, or forward error correction mechanisms.

In accordance with embodiments of the present invention, to achieve data packet detection and timing/frequency synchronization, either the preamble or the access address ("AA") of a received data packet, or both, may be used. For wireless communication implementations utilizing BLE-LR, using the AA entirely for packet detection can potentially offer at least 5 dB greater performance due to its length and randomness. However, this involves two disadvantages. First, to be able to demodulate the AA, the signal associated with the AA field may have to be buffered, which introduces a latency equal to the duration of the AA field (e.g., 256 µs) if a synchronous demodulator is used. This alone can lead to significantly exceeding the latency budget of the receiver 210 (e.g., an amount of time a particular receiver, such as within a BLE-LR device, is required to detect a received data packet before timing out, such as to preserve stored power in the device). Second, a correlator that may be used within such an implementation would likely have to be implemented with high complexity from a processing perspective (and as a result, requiring more sophisticated electronic circuitry), which would result in an increase in the current drain and die size of the receiver 210.

Therefore, in order to reduce the latency and the complexity of the demodulator (e.g., the symbol demodulator 504) so that it can operate at a lower power, it may be beneficial for a receiver to be configured to detect only the preamble field of the data packet (if the timing/frequency synchronization performance is acceptable for the demodulator at the SNR operating point), or in combination with a portion of the AA field (if further refining of the synchronization information is needed).

Figure 8:
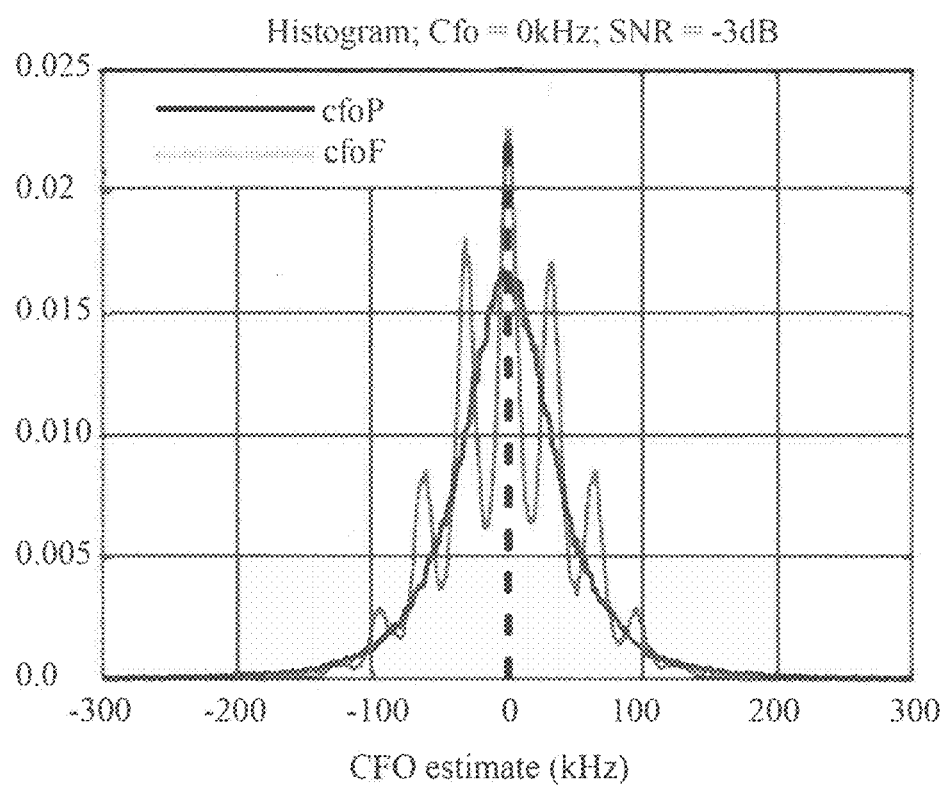
FIGS. 8 and 9 illustrate histograms of cfoP and cfoF estimates for a BLE-LR communication when the receive signal has a CFO of 0 kHz and 150 kHz, respectively.
Figure 9:
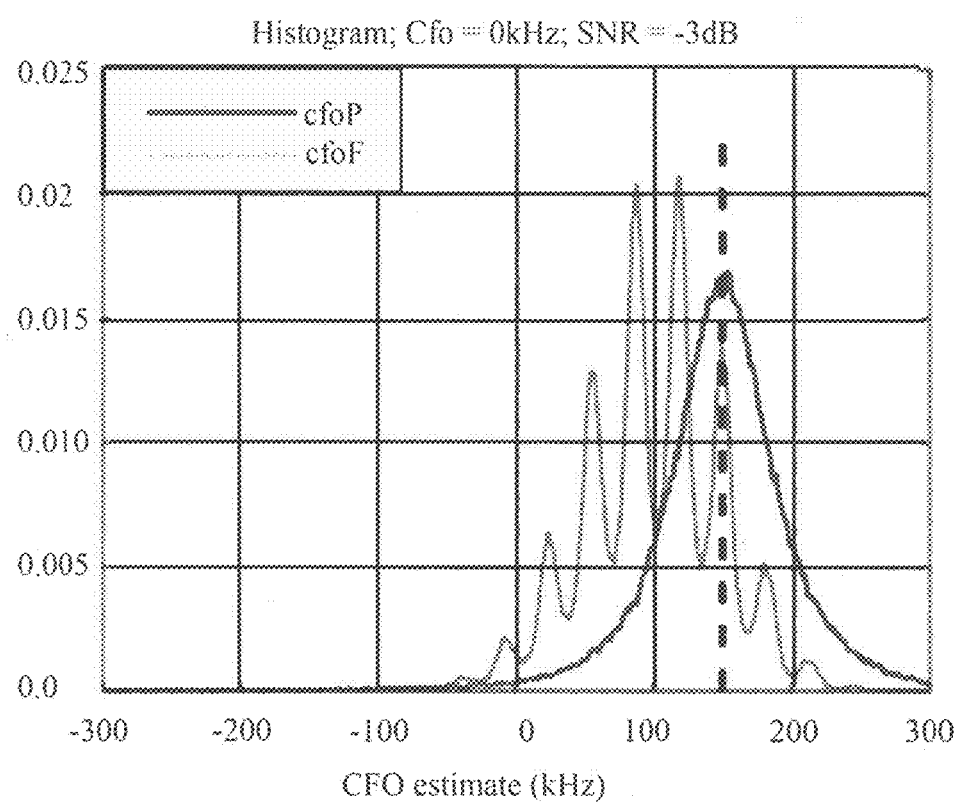

As a result, embodiments of the present invention provide a preamble-only based synchronization in which only the preamble field of a received data packet is utilized (e.g., see FIGS. 3 and 4), and not in combination with the AA, whereby the preamble-only based synchronization includes preamble detection, symbol timing synchronization, CFO estimation determination, and compensation of a received RF signal utilizing the determined CFO estimation. However, such an implementation results in challenges when the receiver 210 is required to process received RF signals at a very low SNR (e.g., a 90% detection rate for a SNR of −3 dB). The low SNR reception challenges the preamble detector from two perspectives: low correlation peaks and a high probability of π-wraps in the discriminated phase domain that leads to wrapping of the CFO estimation (for example, see the spreading of the error distribution on a raster as shown in FIGS. 8 and 9).

To compensate for such CFO estimation wrapping, embodiments of the present invention are configured to utilize two CFO estimator components: (1) a coarse one that is insensitive (e.g., immune) to πn-wraps, but has a high error standard deviation (used for CFO coarse localization); and (2) a fine one that is sensitive to π-wraps, but is more accurate (used for CFO fine estimation). As will be described hereinafter, the more coarse CFO estimator component is a frequency modulation ("FM") (i.e., discriminated phase at symbol rate) domain CFO estimate component, and the more fine CFO estimator component is a phase domain CFO estimate component.

In accordance with embodiments of the present invention, the CFO acquisition is based upon using current and history information of estimated CFO corrections that have been qualified by a correlation magnitude. For low correlation peaks, embodiments of the present invention are configured to utilize a wide correlation window (e.g., 3 or 4 octets) and a lower threshold (to increase the detection rate) with a correlation peaks confirmation (to decrease a rate of false positives that a preamble has been detected).

Figure 6:
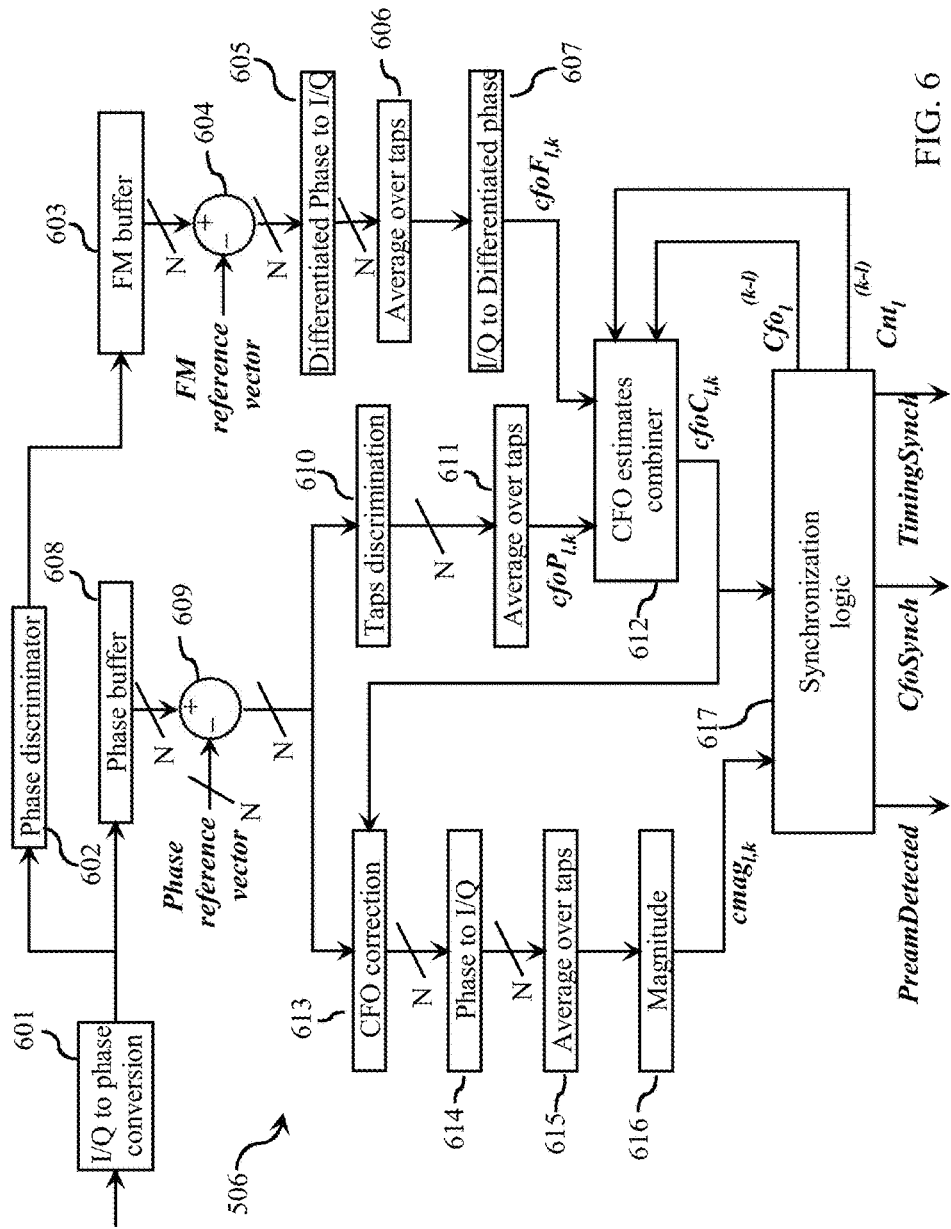
FIG. 6 illustrates a block diagram of a preamble detection mechanism configured in accordance with embodiments of the present invention.
Figure 7:
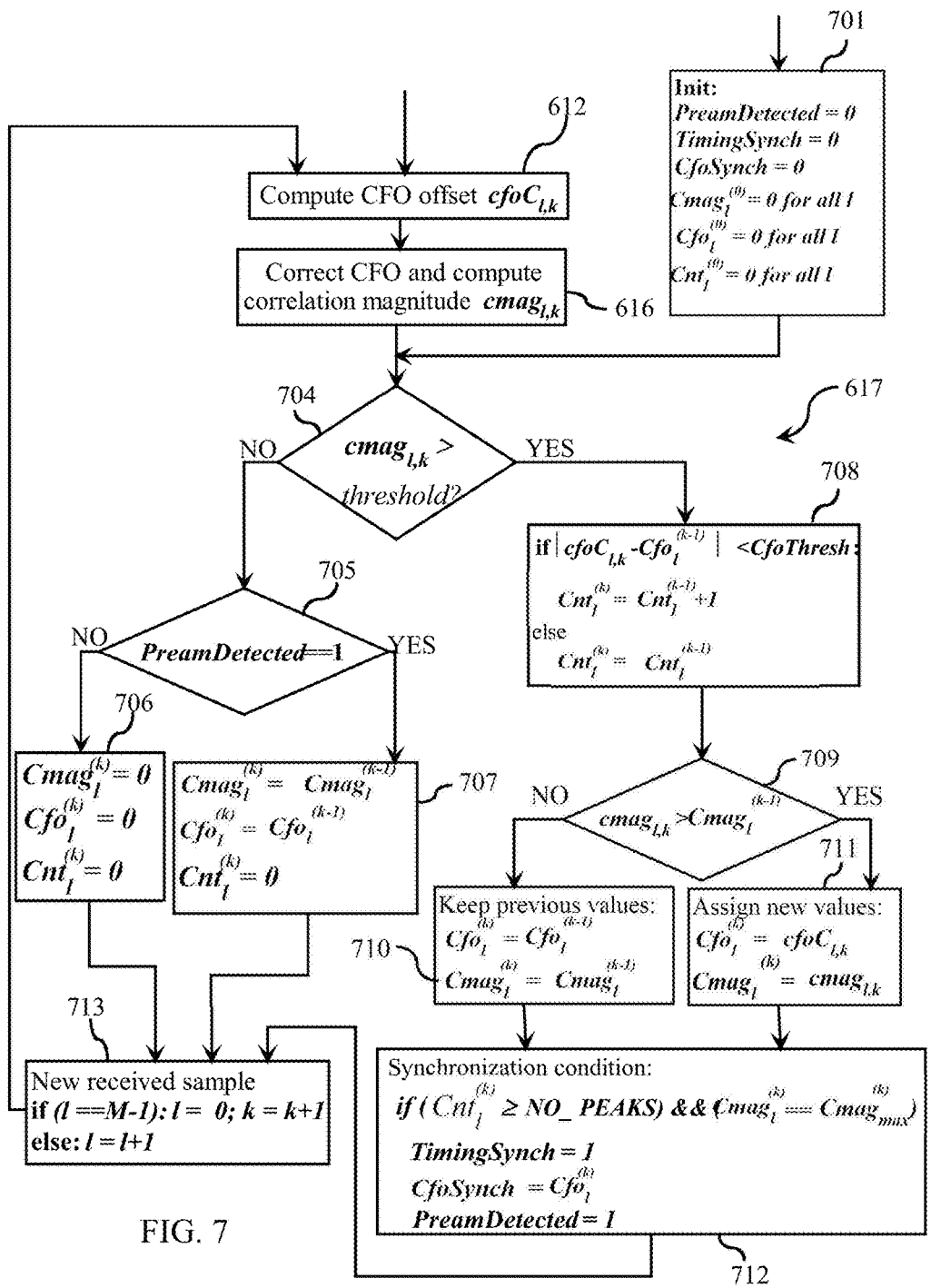
FIG. 7 illustrates a flowchart diagram of synchronization logic implemented within the preamble detection mechanism of FIG. 6.

Within FIGS. 6-7 and the following equations, l represents a preamble phase (i.e., sample index modulo M), taking values within 0 ... M−1, and k represents a preamble period index (a period is M samples). As a result, an index of a currently received sample t has the relation t=kM+l.

FIG. 6 illustrates a block diagram of further details pertaining to the packet synchronization block 506, which is configured to determine (1) the phase domain CFO estimate component (also designated herein as "$cfoP_{l,k}$"), (2) the FM domain CFO estimate component (also designated herein as "$cfoF_{l,k}$"), (3) a correlation magnitude (also designated herein as "$cmag_{l,k}$"), and (4) a synchronization information update component. Correspondingly, for each newly received sample of the received RF signal, the following processing cycles may be implemented within the packet synchronization block 506: (1) a first cycle is utilized to estimate a CFO correction and apply the estimated CFO correction to received phase samples that have been subtracted from a phase reference vector, and (2) a second cycle is utilized to determine a correlation magnitude pertaining to these received samples to which the estimated CFO correction has been applied, and update synchronization information.

The packet synchronization block 506 receives the I and Q signal components and performs an I/Q to phase conversion in the I/Q to phase conversion process block 601, which may be configured to perform a Cartesian to polar coordinates conversion (only the angle is determined), which follows a principle that the I and Q signal components are converted into the phase domain by the equation $\tan^{-1}(Q/I)$. Such an I/Q to phase conversion may be implemented within the I/Q to phase conversion process block 601 using a lookup table or a CORDIC ("COordinate Rotation DIgital Computer") algorithm (which is also known as Volder's algorithm), which are both well-known in the art. For example, such a CORDIC can be configured to convert the received digital signal from rectangular coordinates into polar coordinates to yield a magnitude and phase of the received digital signal.

In accordance with embodiments of the present invention, a significant portion of the processing by the packet synchronization block 506 may be performed in the phase domain for implementation complexity reasons. However, if desired, the packet synchronization block 506 (and correspondingly, the process blocks shown in FIG. 6) can be adapted by one of ordinary skill in the art to perform equivalent processing in a complex numbers domain (i.e., by utilizing the I and Q signal component samples instead of converting them to phase samples).

With reference to FIG. 6, refer now to the determination of the previously disclosed "coarse" CFO estimator component (i.e., the FM domain CFO estimate component) by the packet synchronization block 506. In accordance with embodiments of the present invention, process blocks for determining the FM domain CFO estimate component may include a phase discriminator 602, a FM buffer 603, a mixer 604, a differentiated phase to I/Q process block 605, an average over taps process block 606, and an I/Q to differentiated phase process block 607. A phase discriminator 602 is configured to determine the differences between successively received samples from the I/Q to phase conversion process block. In accordance with embodiments of the present invention, the phase discriminator 602 may be configured to convert the received samples from the phase domain to a FM domain, i.e., the signal phase trajectory is converted to a non-return-to-zero ("NRZ") signal, and the phase trajectory due to an incurred CFO in the received RF signal (which is a ramp) is converted into a DC level. As a result, the output of the phase discriminator 602 may be configured to be a NRZ signal offset by the DC level, which is linearly dependent on the CFO inherent in the RF signal received by the receiver 210. In accordance with embodiments of the present invention, a FM buffer 603 may be implemented to buffer the FM domain samples (i.e., store the samples) received from the phase discriminator 602.

For each of the received samples in the frequency domain, the mixer 604 is configured to determine the difference between the sample and that of a reference vector (e.g., representing the repeating pattern of the preamble of the received data packet(s)), which results in a value representing an estimated CFO correction in the phase domain for each of the samples. The FM buffer 604 is configured to map the received samples on a vector that is input to N-dimensional vector operations, as represented in FIG. 6 along various signal paths with the letter "N." These vectorized samples are then compared to the reference vector by the mixer 604. The differentiated phase to I/Q process block 605 returns these values to the I/Q domain in the I/Q to phase conversion process block 601, which may be configured to perform an operation that is essentially the reverse of the operation performed in the I/Q to phase conversion process block 601 (i.e., a polar to Cartesian coordinates conversion). Then, the average over taps process block 606 is configured to receive the output of the differentiated phase to I/Q process block 605, and determine the average I value and the average Q value over the inputted N-dimensional vector. The I/Q to differentiated phase process block 607 is configured to convert these back into the phase domain (which may be performed in a manner similar to the I/Q to phase conversion process block 601) to produce, for each sample, the FM domain CFO estimate component, represented herein as $cfoF_{l,k}$, which is delivered to the CFO estimates combiner process block 612.

In accordance with embodiments of the present invention, the FM domain CFO estimate component, $cfoF_{l,k}$, may be determined by the process blocks 604-607 using the relation:

$$cfoF_{l,k} = \angle\left(\frac{1}{N}\sum_{n=0}^{N-1} \exp(j(f_{kM+l-nP} - \theta_n))\right)$$

where $f_t$ represents the received FM samples; $t=kM+l$; $\theta_n$ represents the reference FM value corresponding to the n-th correlation tap; P represents the ratio between the over-sampling rate of the input samples and the over-sampling rate used for CFO estimation and correlation; n is the index of a value in the N-dimensional vector at the input of the process block 606; and "$\angle$" represents that the equation performs a Cartesian to polar coordinates conversion.

Refer now to the determination of the previously disclosed "fine" CFO estimator component (i.e., the phase domain CFO estimate component) by the packet synchronization block 506. In accordance with embodiments of the present invention, process blocks for determining the phase domain CFO estimate component may include a phase buffer 608, a taps discrimination process block 610, and an average over taps process block 611. The phase buffer 608 stores the phase samples from the I/Q to phase conversion process block 601. The phase buffer 608 is configured to map the received phase samples on a vector that is input to N-dimensional vector operations, as represented in FIG. 6 along various signal paths with the letter "N." These vectorized phase samples are then compared to a phase reference vector by a mixer 609, which is configured to determine the difference between the received vectorized phase samples and that of a phase reference vector.

The taps discrimination process block 610 is configured to operate similar to the phase discriminator process block 602 so as to determine the differences in the slope between two successive samples. The average over taps process block 611 is configured to determine the average CFO slope for each of the samples, producing the phase domain CFO estimate component, represented herein as $cfoP_{l,k}$, which is provided to the CFO estimates combiner process block 612.

In accordance with embodiments of the present invention, the phase domain CFO estimate component, $cfoP_{l,k}$, may be determined by the process blocks 609-611 using the following relation:

$$cfoP_{l,k} = \frac{1}{N}\sum_{n=0}^{N-1}(r_n^{l,k} - r_{n-1}^{l,k})$$

where $r_n^{l,k} = \varphi_{kM+l-nP} - \xi_n$ and where $\varphi_t$ represents the received phase samples, $t=kM+l$, which is the most recent element in the N-dimensional vector (n is an offset inside the N-dimensional vector), N represents the number of samples used for correlation (N is equal to K*L times the receiver over-sampling rate and divided by the decimation factor of the correlation and CFO estimation operations), M represents the number of preamble phases (i.e., number of samples at the input sample rate that correspond to one preamble period), l represents the preamble phase counter (with a modulo M), k represents the preamble period counter (index), P represents the ratio between the over-sampling rate of the input samples and the over-sampling rate used for CFO estimation and correlation, n represents the index of the correlation tap, and $\xi_n$ represents the reference phase value corresponding to the n-th correlation tap. The reference phase values should substantially resemble the preamble pattern being received in the RF signal when no impairments are considered (i.e., noise, CFO, etc.).

As previously indicated, the determined phase domain CFO estimate component, $cfoP_{l,k}$, may be prone to $\pi$-wraps, but provides a better estimation accuracy, whereas the FM domain estimate component, $cfoF_{l,k}$, is less accurate but immune to $\pi$-wraps. In the case of wireless communication implementations utilizing BLE-LR, the error of the phase domain CFO estimate component has a quantized component of the error due to the $\pi$-wraps of a form $2m\pi/8K$, where m is an integer representing the number of positive wraps minus the number of negative wraps, since the correlation length is K octets (8K bits).

The CFO estimates combiner process block 612 is configured to determine, from $cfoF_{l,k}$ and $cfoP_{l,k}$ an estimated CFO correction for each of the samples, represented herein as $cfoC_{l,k}$, which is provided to the synchronization logic block 617 and to the CFO correction process block 613. The CFO estimates combiner process block 612 is described herein for a BLE-LR implementation, but it can be easily generalized. The CFO estimates combiner process block 612 uses the following relation to determine the estimated CFO correction for each sample (recall that the $Cfo_l^{(k)}$ and $Cnt_l^{(k)}$ values are information stored in the synchronization logic block 617 for the (kM+l)-th received sample; see FIG. 7):

$$cfoC_{l,k} = \begin{cases} cfoP_{l,k} + \frac{2\pi}{8K}\text{round}\left(\frac{(cfoF_{l,k} - cfoP_{l,k})8K}{2\pi}\right), & \text{if } Cnt_l^{(k-1)} = 0 \\ cfoP_{l,k} + \frac{2\pi}{8K}\text{round}\left(\frac{(Cfo_l^{(k-1)} - cfoP_{l,k})8K}{2\pi}\right) & \text{if } Cnt_l^{(k-1)} \neq 0 \end{cases}$$

Note that in the above relation, "round" means that a real number is replaced with the closest integer (solely for purposes of presenting an example of "round," 2.71 would be replaced with 3, and 2.31 would be replaced with 2). The first part of the sum in each branch is the accurate estimation, and the second part is the coarse localization (i.e., quantum determination). If stored information corresponding to preamble phase l is available, then the stored CFO estimation, $Cfo_l^{(k-1)}$, is used as a reference (see the second branch of the above relation). If no valid stored CFO estimation is available (i.e., $Cnt_l^{(k-1)}=0$), then the FM domain CFO estimate component, $cfoF_{l,k}$, is used as a reference. In accordance with embodiments of the present invention, to save power, all or some of the circuitry utilized to implement the FM domain CFO estimate component can be disabled for preamble phases where a stored count value, $Cnt_l^{(k-1)}$, is different than zero. Note that the localization may be coarse only if a CFO valid stored estimation, $Cfo_l^{(k-1)}$, is not available, since the stored CFO estimation, $Cfo_l^{(k-1)}$, itself is an accurate estimation.

The estimated CFO correction, $cfoC_{l,k}$, may be applied to the samples from the mixer 609 by the CFO correction process block 613 using the following relation:

$$r_{corrected_n}^{l,k} = r_n^{l,k} + 2\pi n P^* cfoC_{l,k}$$

In the phase to I/Q process block 614, the signals from the CFO correction process block 613 are converted from the phase domain to the I/Q domain. Note that since a "Phase to I/Q" block (605 and 614) is used by the correlation computation and by the CFO estimation in different processing cycles, in accordance with embodiments of the present invention, it can be shared between the two operations in such implementations. The average over taps process block 615 is configured to determine the averages of the I and the Q components. These are then provided to the magnitude process block 616.

In accordance with embodiments of the present invention, a correlation magnitude may be determined by the magnitude process block 616 using the relation:

$$cmag_{l,k} = \left| \frac{1}{N} \sum_{n=0}^{N-1} \exp\left(j r_{corrected_n}^{l,k}\right) \right|$$

However, within other embodiments of the present invention, the above-mentioned phase domain operations can be replaced by I/Q domain operations. For example, suppose the received I/Q samples are $x_{kM+l-nP}$ and the reference values are $z_n$. The duality phase values in relation to I/Q values are then described as follows:

$$\xi_n = \text{angle}(z_n)$$

$$\varphi_{kM+l-nP} = \text{angle}(x_{kM+l-nP})$$

Then the reference sequence would be removed by using:

$$r_n^{l,k} = x_{kM+l-nP} * conj(z_n)$$

In this case, the corrected values would be:

$$r_{corrected_n}^{l,k} = r_n^{l,k} * \exp(j * 2\pi n P^* cfoC_{l,k})$$

And consequently, the correlation magnitude may be determined using the relation:

$$cmag_{l,k} = \left| \frac{1}{N} \sum_{n=0}^{N-1} r_{corrected_n}^{l,k} \right|$$

Note that within embodiments of the present invention configured to use a phase domain correlation, the arithmetic complexity may be significantly reduced, but magnitude information is lost when performing "angle" operations.

The correlation magnitude, $cmag_{l,k}$, is then provided by the magnitude process block 616 to the synchronization logic block 617.

FIG. 7 illustrates a flowchart diagram of further details pertaining to the synchronization logic block 617. For each preamble phase (e.g., BLE-LR has a repetitive pattern of one octet, which means M=64 preamble phases for an over-sampling rate equal to 8), the synchronization logic block 617 is configured to store the following information:

Stored peaks count, i.e., number of consecutive correlation values that exceed the correlation threshold for that preamble phase ($Cnt_l^{(k)}$ is the stored peaks count corresponding to preamble phase 1 at preamble period count k);

Stored CFO estimation ($Cfo_l^{(k)}$; and

Stored magnitude ($Cmag_l^{(k)}$).

In accordance with embodiments of the present invention, the CFO estimation and correlation magnitude computations may not have the same over-sampling rate as the input phase samples. For example, for wireless communication implementations utilizing BLE-LR, K=4 preamble octets may be used for the correlation and CFO estimation, which translates to 256 samples at the input over-sampling rate (8×), and the correlation and CFO estimation may be performed using N=64 samples (i.e., an over-sampling rate of 2).

Recall that the synchronization logic block 617 of FIG. 6 is configured to receive $cfoC_{l,k}$ from the CFO estimates combiner process block 612, and produce the CFO estimation, CfoSynch, TimingSynch, and PreamDetected signals. In the process block 701, the receiver 210 will initialize to 0 the PreamDetected, TimingSynch, and CfoSynch values. Additionally, for all preamble phases l, the receiver 210 will initialize to 0 the values for the following parameters utilized within the synchronization logic block 617: a stored correlation magnitude, $Cmag_l^{(0)}$, a CFO estimation, $Cfo_l^{(0)}$, and a count, $Cnt_l^{(0)}$. Note also from FIG. 6 that the synchronization logic block 617 returns to the CFO estimates combiner process block 612 a stored CFO estimation value, $Cfo_l^{k-1}$, and a stored count value, $Cnt_l^{(k-1)}$. In accordance with embodiments of the present invention, the synchronization logic block 617 is configured so that $Cfo_l^{(k)}$, $Cnt_l^{(k)}$, and $Cmag_l^{(k)}$ values will overwrite previously stored $Cfo_l^{(k-1)}$, $Cnt_l^{(k-1)}$, and $Cmag_l^{(k-1)}$ values, so M elements may be utilized within the synchronization logic block 617 for each of the three stored vectors from a memory requirements perspective.

As further depicted in FIG. 7, recall from FIG. 6 that the CFO estimates combiner in process block 612 outputs a CFO offset, $cfoC_{l,k}$, and the magnitude process block 616 outputs a correlation magnitude, $cmag_{l,k}$, both of which are received by the synchronization logic block 617. The process block 704 is configured to determine whether the correlation magnitude, $cmag_k$, received from the process block 616 exceeds a predetermined threshold value. Such a predetermined threshold value may be user selected so that the probability of preamble detection is maximized while maintaining the probability of false positives (also referred to as "false alarms") at an acceptable low value. What may be considered an acceptable low value regarding the probability of false positives may differ from one use case to another. For instance, determination of the predetermined threshold value in order to maximize the probability of detection while maintaining the probability of false positives at an acceptably low value may be related to particular power consumption requirements pertaining to the receiving device 102.

If the correlation magnitude, $cmag_{l,k}$, received from the process block 616 does not exceed a predetermined threshold value, then the process block 705 is configured to determine whether a preamble of a received data packet has yet to be detected by the synchronization logic block 617 (see the process block 712). If a preamble of a received data packet has not yet been detected, then the process block 706 is configured to maintain the $Cmag_l^{(k)}$, $Cfo_l^{(k)}$, and $Cnt_l^{(k)}$ values at 0. However, if a preamble has been detected, then the process block 707 is configured to modify the correlation magnitude value $Cmag_l^{(k)}$ to be equal to the stored correlation magnitude value $Cmag_l^{(k-1)}$, the CFO estimation, $Cfo_l^{(k)}$, modified to be equal to the stored CFO estimation, $Cfo_l^{(k-1)}$, and the count value, $Cnt_l^{(k)}$, is overwritten with a 0 value.

Thereafter, in the process block 713, the synchronization logic block 617 receives $cmag_{l,k}$ and $cfoC_{l,k}$ pertaining to a new sample for processing. With respect to this new sample, if the preamble phase is equal to M−1, then the preamble phase l is maintained at 0, and the preamble period k is incremented. Otherwise, the preamble phase l is incremented. Recall that l is a modulo M value (i.e., l counts values from 0 to M−1 and, when it reaches M−1, it wraps back to 0 (e.g., if M=4, then l will take values in the sequence 0,1,2,3,0,1,2,3,0,1,2,3, etc.). k counts [0, . . . , M−1] intervals, one such interval corresponding to the duration of a preamble pattern period (i.e., it increments each time l wraps back to 0 (e.g., for the same previous example, if M=4, then k will take on the following values 0,0,0,0,1,1,1,1,2,2,2,2, etc.)

The synchronization logic block 617 will then wait to receive from the process blocks 612 and 616, respectively, the computations of the estimated CFO correction, $cfoC_{l,k}$, and the correlation magnitude, $cmag_{l,k}$, relative to the newly received sample (see the discussion relative to FIG. 6).

If, during the processing of a sample within the synchronization logic block 617, the process block 704 determines that the correlation magnitude, $cmag_{l,k}$, is greater than the predetermined threshold value, then the synchronization logic block 617 will proceed to the process block 708. The process block 708 is configured to determine whether an estimated CFO correction, $cfoC_{l,k}$, for the currently processed sample is near in magnitude (as determined by a predetermined threshold value, CfoThresh) to a stored CFO estimation, $Cfo_l^{(k-1)}$, determined for the previous preamble period. In accordance with embodiments of the present invention, such a predetermined threshold value, CfoThresh, may be an empirically obtained parameter as preselected by the user.

If the estimated CFO correction, $cfoC_{l,k}$, for the currently processed sample is near in magnitude to a stored CFO estimation, $Cfo_l^{(k-1)}$, determined for the previous preamble period, then the count is incremented. Otherwise, the count is maintained at its previous value. Thereafter, the process block 709 is configured to determine whether the correlation magnitude, $cmag_{l,k}$, received from the process block 616 for the current sample is greater than the stored correlation magnitude $Cmag_l^{(k-1)}$, pertaining to a sample from the previous preamble period. If during the processing by the synchronization logic block 617, it is determined in the process block 709 that the correlation magnitude, $cmag_{l,k}$, is greater than the stored correlation magnitude value, $Cmag_l^{(k-1)}$, then the synchronization logic block 617 will proceed to the process block 711. The process block 711 is configured to assign a value for the CFO estimation, $Cfo_l^{(k)}$, to be equal to the estimated CFO correction, $cfoC_{l,k}$. Additionally, the process block 711 is configured to assign a new value for the stored correlation magnitude, $Cmag_l^{(k)}$, to be equal to the correlation magnitude, $cmag_{l,k}$, received from the process block 616.

If during the processing by the synchronization logic block 617, it is determined in the process block 709 that the correlation magnitude, $cmag_{l,k}$, is not greater than the stored correlation magnitude value, $Cmag_l^{(k-1)}$, then the synchronization logic block 617 will proceed to the process block 710. The process block 710 is configured to maintain the previous values for the CFO estimation and the stored correlation magnitude. In other words, the CFO estimation, $Cfo_l^{(k)}$, is maintained with a previously stored CFO estimation, $Cfo_l^{(k-1)}$, from the previous preamble period. And, the stored correlation magnitude, $Cmag_l^{(k)}$, is maintained with the previous value of the stored correlation magnitude, $Cmag_l^{(k-1)}$, from the previous preamble period.

The process block 712 is configured to determine whether the stored count value, $Cnt_l^{(k)}$, is greater than or equal to the predetermined number of peaks and (i.e., a logical AND) whether the stored correlation magnitude, $Cmag_l^{(k)}$, is equal to a maximum correlation magnitude value, $Cmag_{max}^{(k)}$. $Cmag_{max}^{(k)}$ is a maximum value in the vector Crag determined across all preamble phase l's, corresponding to the preamble phase with the highest stored correlation magnitude. If these conditions are met, then the process block 712 is configured to determine that a preamble of a received data packet has been detected (designated as PreamDetected=1), and that the CFO estimation, CfoSynch, will be set to be equal to the previously determined CFO estimation value, $Cfo_l^{(k)}$, by the synchronization logic block 617. Furthermore, the process block 712 is configured to determine that there has been a timing synchronization achieved (designated as TimingSynch=1). Timing synchronization means that the timing and frequency synchronization block 232 (see FIG. 2) has determined the time boundary of the detected preamble repeating pattern.

Therefore, as demonstrated in FIG. 7, the synchronization logic block 617 may be configured to implement the following rules. A new CFO estimation (i.e., CfoSync=$Cfo_l^{(k)}$) obtained for a preamble phase l in the process block 712 is qualified by its associated correlation magnitude (i.e., $cmag_{l,k}$) not only exceeding the correlation threshold (i.e., the YES path from the process block 704), but also exceeding the already stored correlation magnitude (i.e., $Cmag_l^{(k-1)}$) (see the YES path from the process block 709). A count is incremented (i.e., $Cnt_l^{(k)}$=$Cnt_l^{(k-1)}$+1) in the process block 708 if a current CFO offset (i.e., $cfoC_{l,k}$) is near in magnitude to the stored CFO estimation (i.e., $Cfo_l^{(k-1)}$ in order to minimize the effect of CFO outlier estimates. If a correlation magnitude, $cmag_{l,k}$, does not exceed the threshold (i.e., the NO path from the process block 704), but preamble detection is asserted (i.e., the YES path from the process block 705), the correlation magnitude and CFO estimation information are not reset to 0 (see the process block 707), which allows keeping track of synchronization information even if the preamble portion of the packet has ended.

The parameter NO_PEAKS represents a predetermined number (e.g., any positive integer predetermined by the user) of consecutive correlation magnitudes (i.e., $cmag_{l,k}$) that needs to meet or exceed the predetermined number (i.e., $Cnt_l^{(k)}$≥NO_PEAKS) for a certain preamble phase l in order to assert that a preamble has been detected. In general, NO_PEAKS may be predetermined depending on the structure of the preamble (e.g., its length) and/or other user-defined requirements (e.g., an acceptable probability of receiving false alarms). For example, if NO_PEAKS is set higher, then a probability of false alarms decreases. Thus, preamble detection is asserted in the process block 712 based upon a correlation magnitude exceeding the threshold (see the process block 704) for a certain phase l and for a certain number of preamble periods NO_PEAKS; this peak confirmation mechanism may be configured to minimize the rate of false alarms. Preamble detection assertion (i.e., PreamDetected=1) and timing/frequency synchronization (i.e., TimingSynch=) are conditioned by the stored correlation magnitude being maximal across all preamble indexes (i.e., $Cmag_l^{(k)}$=$Cmag_{max}^{(k)}$) in order to maximize a probability of obtaining the best possible timing/CFO estimations. The process block 712 may be configured to maintain the values of the variables TimingSynch, CfoSynch, and PreamDetected if the above-described conditions are not met.

In accordance with embodiments of the present invention, when a preamble of a received data packet is detected, the preamble-based synchronization in FIG. 7 may be configured to keep running to be able to improve the timing/frequency synchronization information, and/or to be able to properly time-out the frame synchronization (e.g., access an address match in the case of a BLE-LR implementation).

Embodiments of the present invention are further illustrated by the following examples, which are set forth to illustrate the presently disclosed subject matter and are not to be construed as limiting. The following describes an example of how embodiments of the present invention might process a preamble of a received data packet (note that this example is not processing a BLE-LR preamble for the sake of simplicity).

Consider an exemplary data packet preamble with a repeating pattern of "01" symbols (i.e., . . . 0101010101010101 . . . , and thus the preamble period in symbols is L=2) that the receiver (e.g., the receiver 210) is attempting to detect, whereby the receiver is configured to operate with an over-sampling ratio ("OSR") of the received signal of OSR=4, and an over-sampling ratio used for correlation is P=2. The period of the preamble expressed in samples is M=8 (L times OSR). The correlation length is 2 periods of the preamble, i.e., "0101," which means that, for a correlation window, 16 samples are buffered, out of which N=8 samples are effectively used for correlation. In Table 1, the term Buffer represents a buffer element within the phase buffer 608 of FIG. 6 containing the most recently received phase samples whereby Buffer[0] contains the most recently received phase sample. Such buffer elements may be utilized because it is assumed that all the reference subtractions pertaining to a correlation value are performed at the same time (although this is an example, and the algorithm is not restricted to this assumption). For the sake of simplicity, this example only describes the evolution of samples processed through the phase buffer 608. However, an evolution of samples processed through the FM buffer 603 can be exemplified in a similar manner.

Table 1 shows an alignment of received phase samples in the phase buffer 608 to the reference phase values, with respect to the following relation, for 1.5 received periods of the preamble (i.e., dynamics of the buffered samples versus a reference relative position). If the reference subtraction for this specific example is rewritten, the following relations are obtained (recall that k is the preamble period index, l is the phase of the preamble inside a period, and the index of the received sample is kM+l):

$$r_n^{l,k} = \varphi_{8k+l-2n} - \xi_n$$

If k=2 and l=1 then:

$$r_0^{2,1} = \varphi_{17} - \xi_0$$

$$r_1^{2,1} = \varphi_{15} - \xi_1$$

$$r_2^{2,1} = \varphi_{13} - \xi_2$$

This is also shown in the Table 1. If perfect alignment is considered when $\xi_0$ is subtracted from $\varphi_{17}$ by the mixer 609, $\xi_1$ is subtracted from $\varphi_{15}$ and so on, then a maximum correlation will be obtained for the preamble phase l=1. Recall that the preamble in this example is a repeated pattern with a period of two symbols (equivalent to M=8 received samples); therefore, after 8 received samples, there is another alignment with the reference phase values and thus a high correlation magnitude. An arrow in the corresponding columns in Table 1 shows the preamble timing.

TABLE 1

| | | k | | | | | | | | | | | |
|---|---|---|---|---|---|---|---|---|---|---|---|---|---|
| | | 2 | 2 | 2 | 2 | 2 | 2 | 2 | 2 | 3 | 3 | 3 | 3 |
| | | | | | | | l | | | | | | |
| Reference | | 0 | 1↓ | 2 | 3 | 4 | 5 | 6 | 7 | 0 | 1↓ | 2 | 3 |
| $\xi_0$ | Buffer[0] | $\varphi_{16}$ | $\varphi_{17}$ | $\varphi_{18}$ | $\varphi_{19}$ | $\varphi_{20}$ | $\varphi_{21}$ | $\varphi_{22}$ | $\varphi_{23}$ | $\varphi_{24}$ | $\varphi_{25}$ | $\varphi_{26}$ | $\varphi_{27}$ |
| | Buffer[1] | $\varphi_{15}$ | $\varphi_{16}$ | $\varphi_{17}$ | $\varphi_{18}$ | $\varphi_{19}$ | $\varphi_{20}$ | $\varphi_{21}$ | $\varphi_{22}$ | $\varphi_{23}$ | $\varphi_{24}$ | $\varphi_{25}$ | $\varphi_{26}$ |
| $\xi_1$ | Buffer[2] | $\varphi_{14}$ | $\varphi_{15}$ | $\varphi_{16}$ | $\varphi_{17}$ | $\varphi_{18}$ | $\varphi_{19}$ | $\varphi_{20}$ | $\varphi_{21}$ | $\varphi_{22}$ | $\varphi_{23}$ | $\varphi_{24}$ | $\varphi_{25}$ |
| | Buffer[3] | $\varphi_{13}$ | $\varphi_{14}$ | $\varphi_{15}$ | $\varphi_{16}$ | $\varphi_{17}$ | $\varphi_{18}$ | $\varphi_{19}$ | $\varphi_{20}$ | $\varphi_{21}$ | $\varphi_{22}$ | $\varphi_{23}$ | $\varphi_{24}$ |
| $\xi_2$ | Buffer[4] | $\varphi_{12}$ | $\varphi_{13}$ | $\varphi_{14}$ | $\varphi_{15}$ | $\varphi_{16}$ | $\varphi_{17}$ | $\varphi_{18}$ | $\varphi_{19}$ | $\varphi_{20}$ | $\varphi_{21}$ | $\varphi_{22}$ | $\varphi_{23}$ |
| | Buffer[5] | $\varphi_{11}$ | $\varphi_{12}$ | $\varphi_{13}$ | $\varphi_{14}$ | $\varphi_{15}$ | $\varphi_{16}$ | $\varphi_{17}$ | $\varphi_{18}$ | $\varphi_{19}$ | $\varphi_{20}$ | $\varphi_{21}$ | $\varphi_{22}$ |
| $\xi_3$ | Buffer[6] | $\varphi_{10}$ | $\varphi_{11}$ | $\varphi_{12}$ | $\varphi_{13}$ | $\varphi_{14}$ | $\varphi_{15}$ | $\varphi_{16}$ | $\varphi_{17}$ | $\varphi_{18}$ | $\varphi_{19}$ | $\varphi_{20}$ | $\varphi_{21}$ |
| | Buffer[7] | $\varphi_9$ | $\varphi_{10}$ | $\varphi_{11}$ | $\varphi_{12}$ | $\varphi_{13}$ | $\varphi_{14}$ | $\varphi_{15}$ | $\varphi_{16}$ | $\varphi_{17}$ | $\varphi_{18}$ | $\varphi_{19}$ | $\varphi_{20}$ |
| $\xi_4$ | Buffer[8] | $\varphi_8$ | $\varphi_9$ | $\varphi_{10}$ | $\varphi_{11}$ | $\varphi_{12}$ | $\varphi_{13}$ | $\varphi_{14}$ | $\varphi_{15}$ | $\varphi_{16}$ | $\varphi_{17}$ | $\varphi_{18}$ | $\varphi_{19}$ |
| | Buffer[9] | $\varphi_7$ | $\varphi_8$ | $\varphi_9$ | $\varphi_{10}$ | $\varphi_{11}$ | $\varphi_{12}$ | $\varphi_{13}$ | $\varphi_{14}$ | $\varphi_{15}$ | $\varphi_{16}$ | $\varphi_{17}$ | $\varphi_{18}$ |
| $\xi_5$ | Buffer[10] | $\varphi_6$ | $\varphi_7$ | $\varphi_8$ | $\varphi_9$ | $\varphi_{10}$ | $\varphi_{11}$ | $\varphi_{12}$ | $\varphi_{13}$ | $\varphi_{14}$ | $\varphi_{15}$ | $\varphi_{16}$ | $\varphi_{17}$ |
| | Buffer[11] | $\varphi_5$ | $\varphi_6$ | $\varphi_7$ | $\varphi_8$ | $\varphi_9$ | $\varphi_{10}$ | $\varphi_{11}$ | $\varphi_{12}$ | $\varphi_{13}$ | $\varphi_{14}$ | $\varphi_{15}$ | $\varphi_{16}$ |
| $\xi_6$ | Buffer[12] | $\varphi_4$ | $\varphi_5$ | $\varphi_6$ | $\varphi_7$ | $\varphi_8$ | $\varphi_9$ | $\varphi_{10}$ | $\varphi_{11}$ | $\varphi_{12}$ | $\varphi_{13}$ | $\varphi_{14}$ | $\varphi_{15}$ |
| | Buffer[13] | $\varphi_3$ | $\varphi_4$ | $\varphi_5$ | $\varphi_6$ | $\varphi_7$ | $\varphi_8$ | $\varphi_9$ | $\varphi_{10}$ | $\varphi_{11}$ | $\varphi_{12}$ | $\varphi_{13}$ | $\varphi_{14}$ |
| $\xi_7$ | Buffer[14] | $\varphi_2$ | $\varphi_3$ | $\varphi_4$ | $\varphi_5$ | $\varphi_6$ | $\varphi_7$ | $\varphi_8$ | $\varphi_9$ | $\varphi_{10}$ | $\varphi_{11}$ | $\varphi_{12}$ | $\varphi_{13}$ |
| | Buffer[15] | $\varphi_1$ | $\varphi_2$ | $\varphi_3$ | $\varphi_4$ | $\varphi_5$ | $\varphi_6$ | $\varphi_7$ | $\varphi_8$ | $\varphi_9$ | $\varphi_{10}$ | $\varphi_{11}$ | $\varphi_{12}$ |

Table 2 shows an evolution of the statistics for the buffered samples shown in Table 1. That is, Table 2 shows an example of a dynamic statistics evolution when a preamble is received, as determined by the process blocks 613-617. The example below corresponds to a case where the SNR is high; therefore, the correlation magnitude may exceed the threshold not only for the preamble timing instants, but also for the neighbor timing instants. Note with respect to Table 2:

Whenever the correlation is above the threshold (i.e., $cmag_{l,k}$>threshold; see the YES path from the process block 704), the count is increased for the index pair (l,k) (i.e., $Cnt^{(k)} = Cnt^{(k-1)} + 1$; see the process block 708).

$Cmag_{max}^{(k)}$ is updated in the process block 712 when the correlation magnitude is greater than the maximum value and the count is greater or equal than an exemplary predetermined NO_PEAKS=2.

When (k,l)=(3,0) there is a $Cmag_{max}^{(k)}$ change; however $Cmag_{max}^{(k)}$ changes again for (k,l)=(3,1) because the preamble phase l=1 corresponds to the preamble timing and thus to a higher correlation magnitude. For (k,l)=(3,2), $Cmag_{max}^{(k)}$ does not change any more.

When $Cmag_{max}^{(k)}$ changes for a certain pair (k,l), the CFO estimation, CfoSynch, used as the output of the packet synchronization block 506 will be the one corresponding to pair (k,l); this is done so that the CFO estimation pertains to the time index with the highest correlation.

TABLE 2

| | | | | | k | | | | | | |
|---|---|---|---|---|---|---|---|---|---|---|---|
| 2 | 2 | 2 | 2 | 2 | 2 | 2 | 2 | 3 | 3 | 3 | 3 |
| | | | | | l | | | | | | |
| 0 | 1↓ | 2 | 3 | 4 | 5 | 6 | 7 | 0 | 1↓ | 2 | 3 |

| | | | | | | | | | | | | |
|---|---|---|---|---|---|---|---|---|---|---|---|---|
| $cmag_{l,k}$ > threshold | 1 | 1 | 1 | 0 | 0 | 0 | 0 | 0 | 1 | 1 | 1 | 0 |
| $Cnt_l^{(k)}$ | 1 | 1 | 1 | 0 | 0 | 0 | 0 | 0 | 2 | 2 | 2 | 0 |
| $cmag_{l,k}$ > $Cmag_{max}^{(k)}$ && $Cnt_l^k \geq 2$ (=>$Cmag_{max}^{(k)}$ changes) | 0 | 0 | 0 | 0 | 0 | 0 | 0 | 0 | 1 | 1 | 0 | 0 |
| PreamDetected | 0 | 0 | 0 | 0 | 0 | 0 | 0 | 0 | 1 | 1 | 1 | 1 |

Table 3 shows an exemplary scenario where a correlation magnitude exceeds the threshold even if no signal is being received, e.g., a dynamic statistics evolution when a false alarm occurs (for example, only noise is being received by the receiver). Note that Table 3 does not show an arrow indicating the preamble timing instants as there is no preamble. What occurs in this exemplary scenario, for a pair of indexes (k,l)=(2,3), the computed correlation magnitude exceeds the threshold, provoking an increment on the count $Cnt_3^2$. However, on the next preamble period k=3, the correlation magnitude is below the threshold, so the count is reset to 0 given that PreamDetected is not asserted (see the process block 706).

TABLE 3

| | | | | | k | | | | | | |
|---|---|---|---|---|---|---|---|---|---|---|---|
| 2 | 2 | 2 | 2 | 2 | 2 | 2 | 2 | 3 | 3 | 3 | 3 |
| | | | | | l | | | | | | |
| 0 | 1 | 2 | 3 | 4 | 5 | 6 | 7 | 0 | 1 | 2 | 3 |

| | | | | | | | | | | | | |
|---|---|---|---|---|---|---|---|---|---|---|---|---|
| $cmag_{l,k}$ > threshold | 0 | 0 | 0 | 1 | 0 | 0 | 0 | 0 | 0 | 0 | 0 | 0 |
| $Cnt_l^{(k)}$ | 0 | 0 | 0 | 1 | 0 | 0 | 0 | 0 | 0 | 0 | 0 | 0 |
| $Cmag_{max}^{(k)}$ changes | 0 | 0 | 0 | 0 | 0 | 0 | 0 | 0 | 0 | 0 | 0 | 0 |
| PreamDetected | 0 | 0 | 0 | 0 | 0 | 0 | 0 | 0 | 0 | 0 | 0 | 0 |

Figure 10:
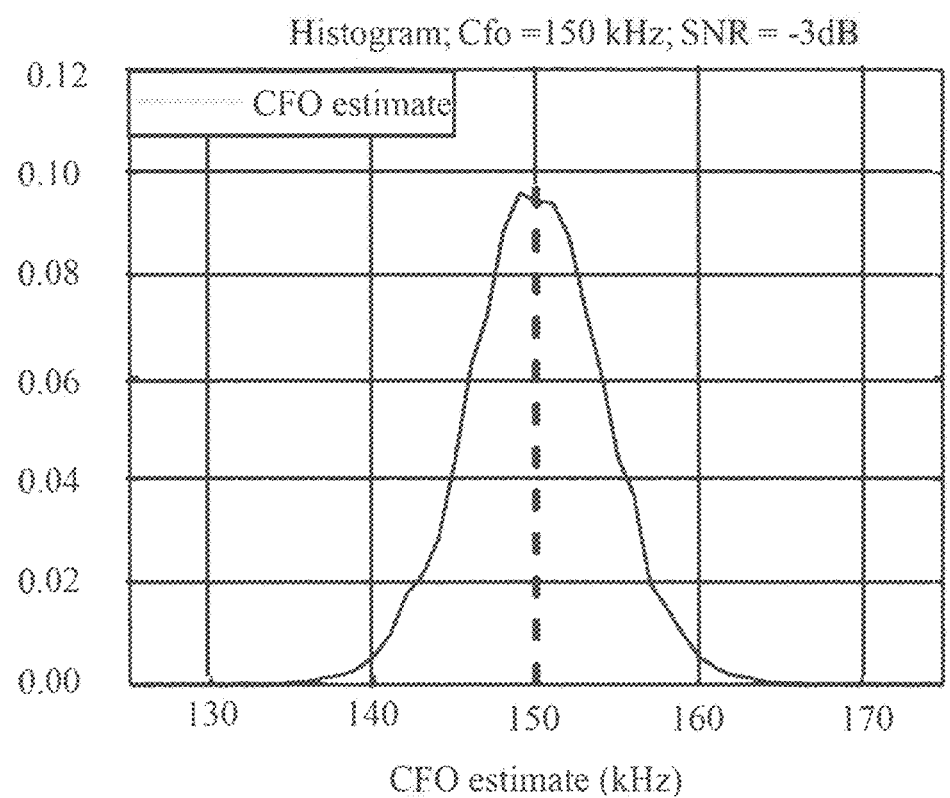
FIG. 10 illustrates an example of a distribution of a final CFO estimation produced by the synchronization logic of FIG. 7.

FIGS. 8-10 will now be referenced to provide a proof of concept utilizing an exemplary embodiment. FIGS. 8 and 9 show the histograms of cfoP and cfoF estimates for a BLE-LR wireless communication implementation, when the received signal has a CFO of 0 kHz and 150 kHz, respectively. K=4 preamble periods are used (one period is equal to the duration of 1 Byte in this case), and the CFO estimation taps are at an over-sampling rate of twice the data rate. The histograms in FIGS. 8-9 confirm that the phase domain estimate component, cfoP, exhibits a multi-modal distribution with values concentrated around the received CFO plus an integer multiple of 32.25 kHz, which is the equivalent of 2π/8K converted to true frequency units.

As it can be observed, when a received CFO is 0 kHz, using the FM domain estimate component, cfoF, does not provide much value. In fact, it slightly degrades the performance of the receiver. However, the situation changes significantly as the received CFO increases. It can be easily observed that the larger CFO more biased the phase-based distribution. This makes the estimation very difficult, as the probability of the estimate to be near the true CFO value is very small. In this case, using the companion FM domain estimate component provides a benefit.

FIG. 10 shows the distribution of the final CFO estimation (e.g., one obtained when the algorithm described in FIG. 7 concludes). The residual CFO error is mostly contained in the [−10,10] kHz range, which is provided by the accuracy of the phase domain CFO estimate component.

Aspects of the present invention provide a method for processing a data packet within a received wireless signal, the method including determining a FM domain CFO estimate component from a plurality of samples of the received wireless signal, determining a phase domain CFO estimate component from the plurality of samples of the received wireless signal, and determining a CFO estimation as a function of the FM domain CFO estimate component and the phase domain CFO estimate component. The data packet may be a Bluetooth Low Energy data packet. The FM domain CFO estimate component and the phase domain CFO estimate component may be determined from samples of a preamble field of the data packet, wherein the preamble field contains a repeating pattern of binary symbols. The FM domain CFO estimate component and the phase domain CFO estimate component may be determined only from samples of a preamble field of the data packet. The determining of the CFO estimation may include determining a first estimated CFO correction as a function of the FM domain CFO estimate component and the phase domain CFO estimate component, and determining if the first estimated CFO correction results in a correlation higher than a predetermined threshold value between samples of the received wireless signal and a reference vector representing a repeating pattern of symbols within a field of the data packet. The determining of the CFO estimation may further include determining a second estimated CFO correction as a function of the first estimated CFO correction and the phase domain CFO estimate component, determining if the second estimated CFO correction results in a correlation higher than the predetermined threshold value between samples of the received wireless signal and the reference vector, and outputting the second estimated CFO correction as the CFO estimation. The method may further include compensating processing of the received wireless signal utilizing the CFO estimation. The CFO estimation may be applied to in-phase and quadrature components of the received wireless signal. The method may further include detecting a preamble field of the data packet as a function of the determined FM domain CFO estimate component and the determined phase domain CFO estimate component.

Aspects of the present invention provide for a communications device including receiver circuitry configured to receive a signal containing a data packet; packet synchronization circuitry including a first CFO estimator component configured to determine a FM domain CFO estimate component from samples of the received signal, a second CFO estimator component configured to determine a phase domain CFO estimate component from the samples of the received signal, and circuitry configured to determine a CFO estimation as a function of the FM domain CFO estimate component and the phase domain CFO estimate component; and CFO correction circuitry configured to compensate processing of the received signal utilizing the CFO estimation. The circuitry configured to determine the CFO estimation may include a CFO estimates combiner configured to determine an estimated CFO correction as a function of the FM domain CFO estimate component and the phase domain CFO estimate component, and synchronization logic configured to determine when the estimated CFO correction results in a correlation magnitude higher than a predetermined threshold value between samples of the received signal and a reference vector representing a pattern of symbols within a field of the data packet. The synchronization logic may be configured to output the estimated CFO correction as the CFO estimation when the estimated CFO correction results in a correlation magnitude higher than the predetermined threshold value. The data packet may be a Bluetooth Low Energy data packet, wherein the FM domain CFO estimate component and the phase domain CFO estimate component are determined only from samples of a preamble field of the Bluetooth Low Energy data packet. The circuitry configured to determine the CFO estimation may include a CFO estimates combiner configured to determine an estimated CFO correction as a function of the FM domain CFO estimate component and the phase domain CFO estimate component, and synchronization logic configured to determine when the estimated CFO correction results in a correlation magnitude higher than a predetermined threshold value between samples of the received signal and a reference vector representing a repeating pattern of symbols within the preamble field of the Bluetooth Low Energy data packet, wherein the synchronization logic is configured to output the estimated CFO correction as the CFO estimation when the correlation magnitude is equal to a maximum correlation magnitude corresponding to a phase within the preamble field. The wireless device may further include a symbol demodulator configured to demodulate the compensated received signal in order to derive the data packet. The wireless device may further include circuitry configured to detect the preamble field of the Bluetooth Low Energy data packet as a function of the determined FM domain CFO estimate component and the determined phase domain CFO estimate component. The FM domain CFO estimate component and the phase domain CFO estimate component may be determined from samples of a repeating pattern of binary symbols contained within a preamble field of the data packet.

Aspects of the present invention provide for a computer program product including a computer readable storage medium having computer readable program code embodied therewith, the computer readable program code including computer readable program code configured to determine a FM domain CFO estimate component from samples of a received RF signal containing a Bluetooth Low Energy data packet, computer readable program code configured to determine a phase domain CFO estimate component from the samples of the received RF signal, and computer readable program code configured to determine a CFO estimation as a function of the FM domain CFO estimate component and the phase domain CFO estimate component. The computer readable program code configured to determine the CFO estimation may include computer readable program code configured to determine an estimated CFO correction as a function of the FM domain CFO estimate component and the phase domain CFO estimate component, computer readable program code configured to determine when the estimated CFO correction results in a correlation higher than a predetermined threshold value between samples of the received RF signal and a reference vector representing a repeating pattern of symbols within a preamble field of the Bluetooth Low Energy data packet, computer readable program code configured to output the estimated CFO correction as the CFO estimation, computer readable program code configured to detect the preamble field of the Bluetooth Low Energy data packet as a function of the determined FM domain CFO estimate component and the determined phase domain CFO estimate component, and computer readable program code configured to compensate processing of the received RF signal utilizing the CFO estimation. The FM domain CFO estimate component and the phase domain CFO estimate component may be determined only from samples of the preamble field of the Bluetooth Low Energy data packet.

Those skilled in the art having read this disclosure will recognize that changes and modifications may be made to the embodiments without departing from the scope of the present invention. It should be appreciated that the particular implementations shown and described herein may be illustrative of the invention and may be not intended to otherwise limit the scope of the present invention in any way. Other variations may be within the scope of the following claims. While this specification contains many specifics, these should not be construed as limitations on the scope of the invention or of what can be claimed, but rather as descriptions of features specific to particular implementations of the invention. Benefits, advantages, and solutions to problems have been described above with regard to specific embodiments. However, the benefits, advantages, solutions to problems, and any element(s) that may cause any benefit, advantage, or solution to occur or become more pronounced may be not to be construed as critical, required, or essential features or elements of any or all the claims.

In the description herein, a flow-charted technique may be described in a series of sequential actions. The sequence of the actions, and the party performing the actions, may be freely changed without departing from the scope of the teachings. Actions may be added, deleted, or altered in several ways. Similarly, the actions may be re-ordered or looped. Further, although processes, methods, algorithms, or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), can also be performed in whole, in part, or any combination thereof.

As will be appreciated by one skilled in the art, aspects of the present invention (e.g., including, but not limited to, the operations and/or functions performed within the timing and frequency synchronization block 232) may be embodied as a system, method, and/or program product. Accordingly, aspects of the present invention (e.g., including, but not limited to, the operations and/or functions performed within the timing and frequency synchronization block 232) may take the form of an entirely hardware embodiment, an entirely software embodiment (including firmware, resident software, micro-code, etc.), or embodiments combining software and hardware aspects that may all generally be referred to herein as a "circuit," "circuitry," "module," or "system." Furthermore, aspects of the present invention (e.g., including, but not limited to, the operations and/or functions performed within the timing and frequency synchronization block 232) may take the form of a program product embodied in one or more computer readable storage medium(s) having computer readable program code embodied thereon. (However, any combination of one or more computer readable medium(s) may be utilized. The computer readable medium may be a computer readable signal medium or a computer readable storage medium.)

A computer readable storage medium may be, for example, but not limited to, an electronic, magnetic, optical, electromagnetic, infrared, biologic, atomic, or semiconductor system, apparatus, controller, or device, or any suitable combination of the foregoing. More specific examples (a non-exhaustive list) of the computer readable storage medium may include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, controller, or device. Program code embodied on a computer readable signal medium may be transmitted using any appropriate medium, including but not limited to wireless, wire line, optical fiber cable, RF, etc., or any suitable combination of the foregoing.

The flowcharts and block diagrams in the figures illustrate architecture, functionality, and operation of possible implementations of systems, methods, and program products according to various embodiments of the present invention. In this regard, each block in the flowcharts or block diagrams may represent a module, segment, or portion of code, which includes one or more executable program instructions for implementing the specified logical function(s). It should also be noted that, in some implementations, the functions noted in the blocks may occur out of the order noted in the figures. For example, two blocks shown in succession may, in fact, be executed substantially concurrently, or the blocks may sometimes be executed in the reverse order, depending upon the functionality involved.

Instructions of such program products may be provided to a processor and/or controller of a general purpose computer, special purpose computer, or other programmable data processing apparatus (e.g., controller) to produce a machine, such that the instructions, which execute via the processor of the computer or other programmable data processing apparatus, create means for implementing the functions/acts specified in the flowchart and/or block diagram block or blocks.

It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. For example, a module may be implemented as a hardware circuit including custom VLSI circuits or gate arrays, off-the-shelf semiconductors such as logic chips, transistors, controllers, or other discrete components. A module may also be implemented in programmable hardware devices such as field programmable gate arrays, programmable array logic, programmable logic devices, or the like.

The program product instructions may also be stored in a computer readable storage medium that can direct a computer, other programmable data processing apparatus, controller, or other devices to function in a particular manner, such that the instructions stored in the computer readable medium produce an article of manufacture including instructions which implement the function/act specified in the flowchart and/or block diagram block or blocks.

The program product instructions may also be loaded onto a computer, other programmable data processing apparatus, controller, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is made herein to elements "configured" for performing some described operation. It should be understood that this may include selecting predefined logic blocks and logically associating them, such that they provide particular logic functions, which includes monitoring or control functions. It may also include programming computer software-based logic, wiring discrete hardware components, or a combination of any or all of the foregoing.

Reference throughout this specification to "one embodiment," "embodiments," or similar language means that a particular feature, structure, or characteristic described in connection with the embodiments is included in at least one embodiment of the present invention. Thus, appearances of the phrases "in one embodiment," "in an embodiment," "embodiments," and similar language throughout this specification may, but does not necessarily all refer to the same embodiment. Furthermore, the described features, structures, aspects, and/or characteristics of the invention may be combined in any suitable manner in one or more embodiments. Correspondingly, even if features may be initially claimed as acting in certain combinations, one or more features from a claimed combination can in some cases be excised from the combination, and the claimed combination can be directed to a sub-combination or variation of a sub-combination.

In the descriptions herein, numerous specific details are provided, such as examples of programming, software modules, user selections, network transactions, database queries, database structures, hardware modules, hardware circuits, hardware chips, controllers, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations may be not shown or described in detail to avoid obscuring aspects of the invention.

Unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present). As used herein, the term "and/or" when used in the context of a listing of entities, refers to the entities being present singly or in combination. Thus, for example, the phrase "A, B, C, and/or D" includes A, B. C, and D individually, but also includes any and all combinations and subcombinations of A, B, C, and D.

Also, the use of "a" or "an" is employed to describe elements and resources described herein. This is done merely for convenience, and to give a general sense of the scope of the invention. This description should be read to include one, or at least one, and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described herein. All publications, patent applications, patents, and other references mentioned herein are incorporated by reference in their entirety, unless a particular passage is cited. In case of conflict, the present specification, including definitions, will control. In addition, the materials, methods, and examples are illustrative only, and not intended to be limiting.

To the extent not described herein, many details regarding specific materials, processing acts, and circuits are conventional, and may be found in textbooks and other sources within the computing, electronics, and software arts.

What is claimed is:

1. A method for processing a data packet within a received wireless signal, the method comprising:
   determining a frequency modulation ("FM") domain carrier frequency offset ("CFO") estimate component from a plurality of samples of the received wireless signal;
   determining a phase domain CFO estimate component from the plurality of samples of the received wireless signal; and
   determining a CFO estimation as a function of the FM domain CFO estimate component and the phase domain CFO estimate component,
   wherein the determining of the CFO estimation comprises:
      determining a first estimated CFO correction as a function of the FM domain CFO estimate component and the phase domain CFO estimate component; and
      determining if the first estimated CFO correction results in a correlation higher than a predetermined threshold value between samples of the received wireless signal and a reference vector representing a repeating pattern of symbols within a field of the data packet, and
      outputting the first estimated CFO correction as the CFO estimation when the correlation is equal to a maximum correlation magnitude corresponding to a phase within a preamble field.

2. The method as recited in claim 1, wherein the data packet is a Bluetooth Low Energy data packet.

3. The method as recited in claim 1, wherein the FM domain CFO estimate component and the phase domain CFO estimate component are determined from samples of the preamble field of the data packet, wherein the preamble field contains a repeating pattern of binary symbols.

4. The method as recited in claim 1, wherein the FM domain CFO estimate component and the phase domain CFO estimate component are determined only from samples of the preamble field of the data packet.

5. The method as recited in claim 1, wherein the determining of the CFO estimation further comprises:
   determining a second estimated CFO correction as a function of the first estimated CFO correction and the phase domain CFO estimate component;
   determining if the second estimated CFO correction results in a correlation higher than the predetermined threshold value between samples of the received wireless signal and the reference vector; and
   outputting the second estimated CFO correction as the CFO estimation.

6. The method as recited in claim 5, further comprising compensating processing of the received wireless signal utilizing the CFO estimation.

7. The method as recited in claim 1, wherein the CFO estimation is applied to in-phase ("I") and quadrature ("Q") components of the received wireless signal.

8. The method as recited in claim 1, further comprising detecting the preamble field of the data packet as a function of the determined FM domain CFO estimate component and the determined phase domain CFO estimate component.

9. A communications device comprising:
   receiver circuitry configured to receive a signal containing a data packet;
   packet synchronization circuitry comprising:
      a first CFO estimator component configured to determine a frequency modulation ("FM") domain carrier frequency offset ("CFO") estimate component from samples of the received signal,
      a second CFO estimator component configured to determine a phase domain CFO estimate component from the samples of the received signal, and
      circuitry configured to determine a CFO estimation as a function of the FM domain CFO estimate component and the phase domain CFO estimate component; and
   CFO correction circuitry configured to compensate processing of the received signal utilizing the CFO estimation;
   wherein the circuitry configured to determine the CFO estimation includes:
      a CFO estimates combiner configured to determine an estimated CFO correction as a function of the FM domain CFO estimate component and the phase domain CFO estimate component; and
      synchronization logic configured to determine when the estimated CFO correction results in a correlation magnitude higher than a predetermined threshold value between samples of the received signal and a reference vector representing a pattern of symbols within a field of the data packet, wherein the synchronization logic is configured to output the estimated CFO correction as the CFO estimation when the correlation magnitude is equal to a maximum correlation magnitude corresponding to a phase within a preamble field.

10. The communications device as recited in claim 9, wherein the synchronization logic is configured to output the estimated CFO correction as the CFO estimation when the estimated CFO correction results in a correlation magnitude higher than the predetermined threshold value.

11. The communications device as recited in claim 9, further comprising a symbol demodulator configured to demodulate the compensated received signal in order to derive the data packet.

12. The communications device as recited in claim 9, further comprising circuitry configured to detect the preamble field of a Bluetooth Low Energy data packet as a function of the determined FM domain CFO estimate component and the determined phase domain CFO estimate component.

13. The communications device as recited in claim 9, wherein the FM domain CFO estimate component and the phase domain CFO estimate component are determined from samples of a repeating pattern of binary symbols contained within the preamble field of the data packet.

14. A communications device comprising:
   receiver circuitry configured to receive a signal containing a data packet;
   packet synchronization circuitry comprising:
      a first CFO estimator component configured to determine a frequency modulation ("FM") domain carrier frequency offset ("CFO") estimate component from samples of the received signal,
      a second CFO estimator component configured to determine a phase domain CFO estimate component from the samples of the received signal, and
      circuitry configured to determine a CFO estimation as a function of the FM domain CFO estimate component and the phase domain CFO estimate component; and
   CFO correction circuitry configured to compensate processing of the received signal utilizing the CFO estimation, wherein the data packet is a Bluetooth Low Energy data packet, and wherein the FM domain CFO estimate component and the phase domain CFO estimate component are determined only from samples of a preamble field of the Bluetooth Low Energy data packet, and
   wherein the circuitry configured to determine the CFO estimation includes:
      a CFO estimates combiner configured to determine an estimated CFO correction as a function of the FM domain CFO estimate component and the phase domain CFO estimate component; and
      synchronization logic configured to determine when the estimated CFO correction results in a correlation magnitude higher than a predetermined threshold value between samples of the received signal and a reference vector representing a repeating pattern of symbols within the preamble field of the Bluetooth Low Energy data packet, wherein the synchronization logic is configured to output the estimated CFO correction as the CFO estimation when the correlation magnitude is equal to a maximum correlation magnitude corresponding to a phase within the preamble field.

15. The communications device as recited in claim 14, further comprising a symbol demodulator configured to demodulate the compensated received signal in order to derive the data packet.

16. The communications device as recited in claim 14, further comprising circuitry configured to detect the preamble field of the Bluetooth Low Energy data packet as a function of the determined FM domain CFO estimate component and the determined phase domain CFO estimate component.

17. The communications device as recited in claim 14, wherein the FM domain CFO estimate component and the phase domain CFO estimate component are determined from samples of a repeating pattern of binary symbols contained within the preamble field of the data packet.

* * * * *